(12) United States Patent
Tsagarakis et al.

(10) Patent No.: US 8,311,911 B2
(45) Date of Patent: Nov. 13, 2012

(54) GLOBAL FOREIGN EXCHANGE SYSTEM

(75) Inventors: Manolis Tsagarakis, Foster City, CA (US); Bea Calo, San Mateo, CA (US)

(73) Assignee: **E*Trade Financial Corporation**, New York, NY (US)

(*) Notice: Subject to any disclaimer, the term of this patent is extended or adjusted under 35 U.S.C. 154(b) by 3000 days.

(21) Appl. No.: 09/789,018

(22) Filed: Feb. 20, 2001

(65) Prior Publication Data

US 2002/0087455 A1   Jul. 4, 2002

Related U.S. Application Data

(63) Continuation-in-part of application No. 09/769,036, filed on Jan. 24, 2001.

(60) Provisional application No. 60/259,268, filed on Dec. 30, 2000.

(51) Int. Cl.
    *G06Q 40/00* (2012.01)
(52) U.S. Cl. .......................................... 705/35
(58) Field of Classification Search ................ 705/35–45
    See application file for complete search history.

(56) References Cited

U.S. PATENT DOCUMENTS

2002/0087454 A1   7/2002   Calo et al. ........................ 705/37

OTHER PUBLICATIONS http://www.fxall.com/news/pressrelease2.html, Jun. 2000.*
HospotFX launches Major Foreign Exchange MArekt Development,. Oct. 11, 2000.*

* cited by examiner

*Primary Examiner* — Richard C Weisberger
(74) *Attorney, Agent, or Firm* — Conley Rose, P.C.

(57) ABSTRACT

A computerized trading system permits global currency trading. The system preferably includes multiple affiliates at the local level, each in a different country, that act as introducing agents. Between these local affiliates there is a global exchange or hub, with the local affiliates and the global hub being arranged in a hub-and-spoke arrangement. Introducing affiliates are responsible for handling customer accounts and information, and accepting orders. The global exchange is responsible for routing orders to one or multiple foreign exchange liquidity banks to handle foreign exchange transactions to convert one currency into another.

25 Claims, 20 Drawing Sheets

GLOBAL FOREIGN EXCHANGE SYSTEM

CROSS-REFERENCE TO RELATED APPLICATIONS

The present application is a continuation-in-part of U.S. patent application Ser. No. 09/769,036, filed Jan. 24, 2001 and claims the benefit under 35 U.S.C. 119(e) of provisional patent Application No. 60/259,268, filed Dec. 30, 2000, both entitled Global Trading System.

STATEMENT REGARDING FEDERALLY SPONSORED RESEARCH OR DEVELOPMENT

Not applicable.

BACKGROUND OF THE INVENTION

1. Field of the Invention

The present invention generally relates to foreign currency exchange (FX) trading in support of the trading of securities and other commodities internationally. More particularly, the present invention relates to a globalized trading network that permits trading of various currencies, either as the asset class or as part of a security transaction.

2. Background of the Invention

The trading of various financial instruments such as equities (i.e. stocks) has been known for many years, and various stock exchanges exist all around the world. For example, one well-known stock exchange in the United States is the New York stock exchange (NYSE), with other being the NASDAQ and the AMEX stock exchanges. The United Kingdom has the London Stock Exchange. However, for a long period the trading of stocks was reserved for either large organizations or for the wealthy, and it was difficult for the ordinary investor to knowledgeably buy and sell individual stocks at reasonable prices. In recent years, the explosive growth of the internet has lowered the time and transaction costs previously necessary to research and trade individual stocks, leading to the popularity of trading of stocks on-line. This lowering of costs is especially true for the investor who is buying or selling stocks that trade on an exchange in his own country.

The problems of cross-border trading of equities has not been so easily solved, however. The conventional method to execute cross-border trading includes the use of telephone calls and facsimiles. For example, a Swedish investor might call his broker and request a trade of an equity handled in a United States exchange. The Swedish broker would call his U.S. counterpart, and contact by phone call or facsimile would then be made with a U.S. market maker, a U.S. bank, a Swedish bank, and a Swedish custodian. Obviously, this is a time consuming and expensive method to make cross-border trades. Therefore, even though there has been a substantial increase in the amount of cross-border trading of equities because of the heightened interest of individual investors, to a great extent individual investors remain limited to buying and selling stocks that trade in the their own markets. For example, despite the attraction of the United States stock market, an Australian investor may be able to buy and sell only stocks that trade on the Australian stock exchange (unless he wishes to pay very high commissions). Similarly, the individual investor in the United States may see opportunities in which he would like to invest in overseas, such as a particular equity in Europe, but the cost of buying and selling these stocks is unrealistically high.

It would be advantageous if there existed a system to simplify cross-border trading of stocks, options, mutual funds, and fixed income instruments. It would also be advantageous if such a system could trade different currencies directly, without any need to trade an equity or other financial instrument in concert.

BRIEF SUMMARY OF THE INVENTION

The disclosed embodiment of the invention solves the deficiencies of the prior art by a computerized system for trading currencies. This system preferably includes a computerized introducing affiliate in the first country from which a transaction order (such as to buy or sell a currency) is transmitted electronically, and a global hub connected electronically the introducing affiliate, as well as to a plurality of computers in a plurality of countries. The global hub includes a foreign exchange bank and a foreign exchange facility.

To convert currency, an order to buy or sell an amount of a first currency in exchange for a second currency is transmitted electronically to a global hub, where it is received, the global hub transmits to the foreign exchange facility the order to sell or buy the first currency, the sale or purchase is executed, and confirmation of the sale or purchase is sent. Because the system is largely, if not exclusively, computerized the transaction costs of each trade are decreased. Because the global hub connects to numerous countries, efficiencies of scale are also achieved.

These and other aspects of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

The detailed description of the preferred embodiment provided below includes many details not essential to the invention. For example, many of the examples below describe a hypothetical party in Australia either buying or selling a security in a U.S. stock market. Many examples below also refer to a unit or element as part of an system managed by E*TRADE. However, the invention is not so limited and is not limited to Australia, the United States, or any specific country. These designations are used merely to simplify the explanation of the preferred embodiment of the invention.

Figure 1:
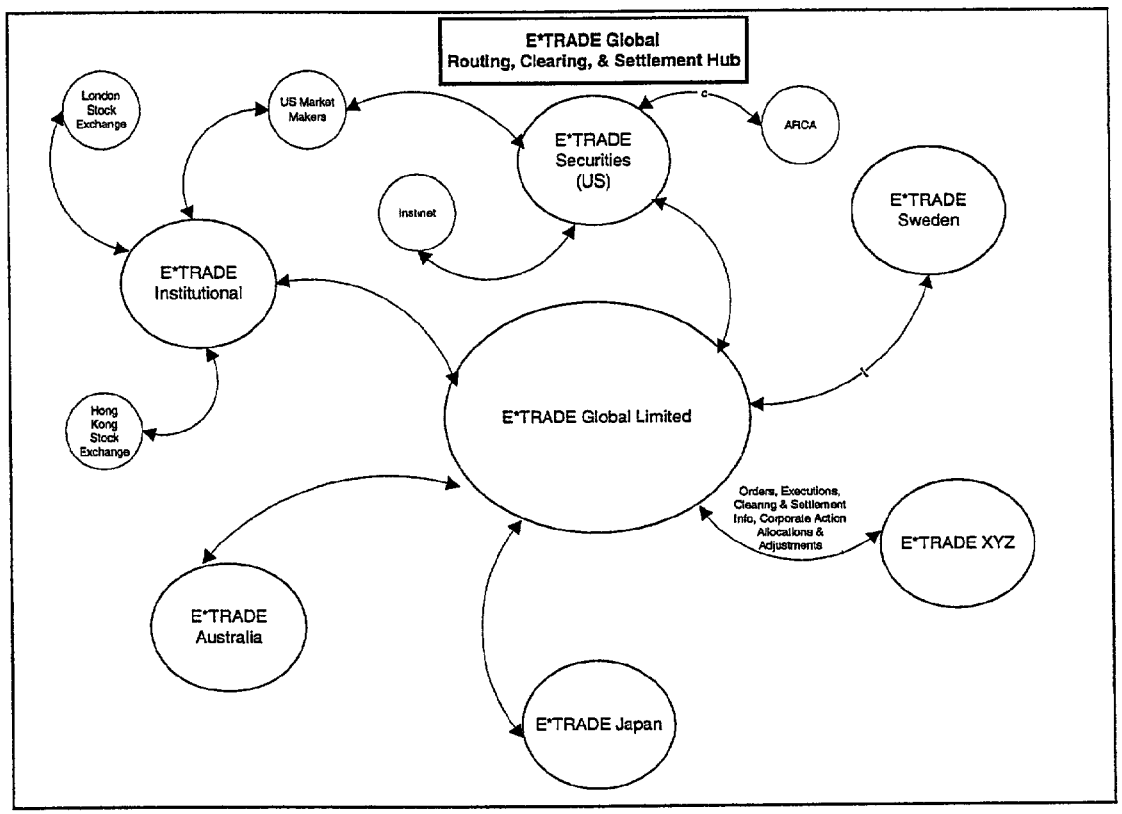
FIG. 1 is a global diagram broadly illustrating the central global system and associated local affiliates.

FIG. 1 is a schematic world map including the E*TRADE Global System connected to various E*TRADE local affiliates such as E*TRADE Securities (ETS) (for the United States), E*TRADE Japan (ET JP), E*TRADE Sweden, E*TRADE Australia (ET AU), E*TRADE XYZ (a non-specific country), and E*TRADE Institutional. Other local affiliates (not shown) might include E*TRADE Canada (ET CA), E*TRADE United Kingdom (ET UK), E*TRADE Israel (ET IL), E*TRADE Germany (ET DE), and E*TRADE Hong Kong (ET HK). Each local affiliate is preferably connected directly to the Global system, with the local affiliate also connected to a local exchange or exchange member, such as INSTINET, ARCA (Archipelago), or the U.S. market makers. In FIG. 1, E*TRADE institutional is an affiliate that caters to the instiutional investor and is not affiliated with only a single country or stock exchange. As shown, it connects to the Hong Kong exchange, the London Stock Exchange, and the U.S. market makers, and also connect to other executing brokers and exchanges.

The cross-border trading model of the preferred embodiment is based on a hub and spoke configuration. All transactions that are executed outside the local market (i.e. non-domestic transaction) are routed through the E*TRADE Global hub by brokers in the network, with each international trade including an introducing broker, the E*TRADE global hub, and normally an executing broker. The system of FIG. 1 allows a customer in any first country with a local affiliate to purchase or sell a stock or other financial instrument that is traded on an exchange in a second country.

Figure 2:
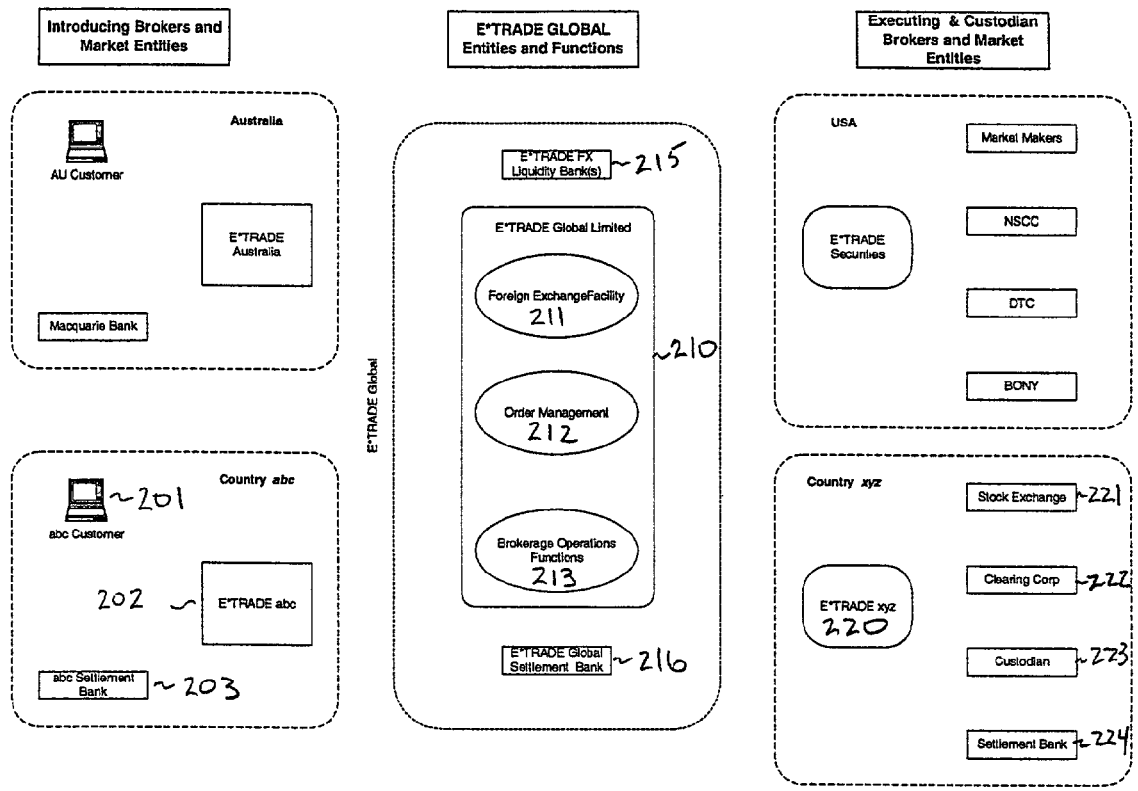
FIG. 2 is a block diagram illustrating an exemplary computer network constructed according to the preferred embodiment.

FIG. 2 illustrates the various entities associated with the introducing broker, the executing broker, and the E*TRADE Global system. Associated with the introducing broker of country abc is a customer 201, the local E*TRADE affiliate 202, and the abc settlement bank 203. The abc customer advantageously accesses the system through an electronic connection, such as with a computer. Corresponding elements for an Australian introducing affiliate are also shown. The E*TRADE Global hub 210 supports a Foreign Exchange Facility 211, an order management system 212 and a brokerage operation system 213 internally. E*TRADE Global 210 also interfaces with a Foreign Exchange (FX) liquidity bank 215, and its own global settlement bank 216. Associated with the executing brokers of country xyz is the local E*TRADE affiliate 220, the stock exchange 221 of the country from where the equities are being purchased, the clearing corporation 222, the custodian 223, and the local settlement bank 224.

The system is envisioned as being implemented primarily on a system of computers or electronics with associated hardware (although there may be some manual interface provided when a particular situation or concern arises such as an extraordinarily large trade order). The use of highly electronic systems lowers the cost of a single trade because it may be executed automatically or near-automatically. In addition, highly electronic systems allow for faster trades, resulting in a more real-time system and lower risks from price movement for both the customer and the party executing the trade.

Figure 3A:
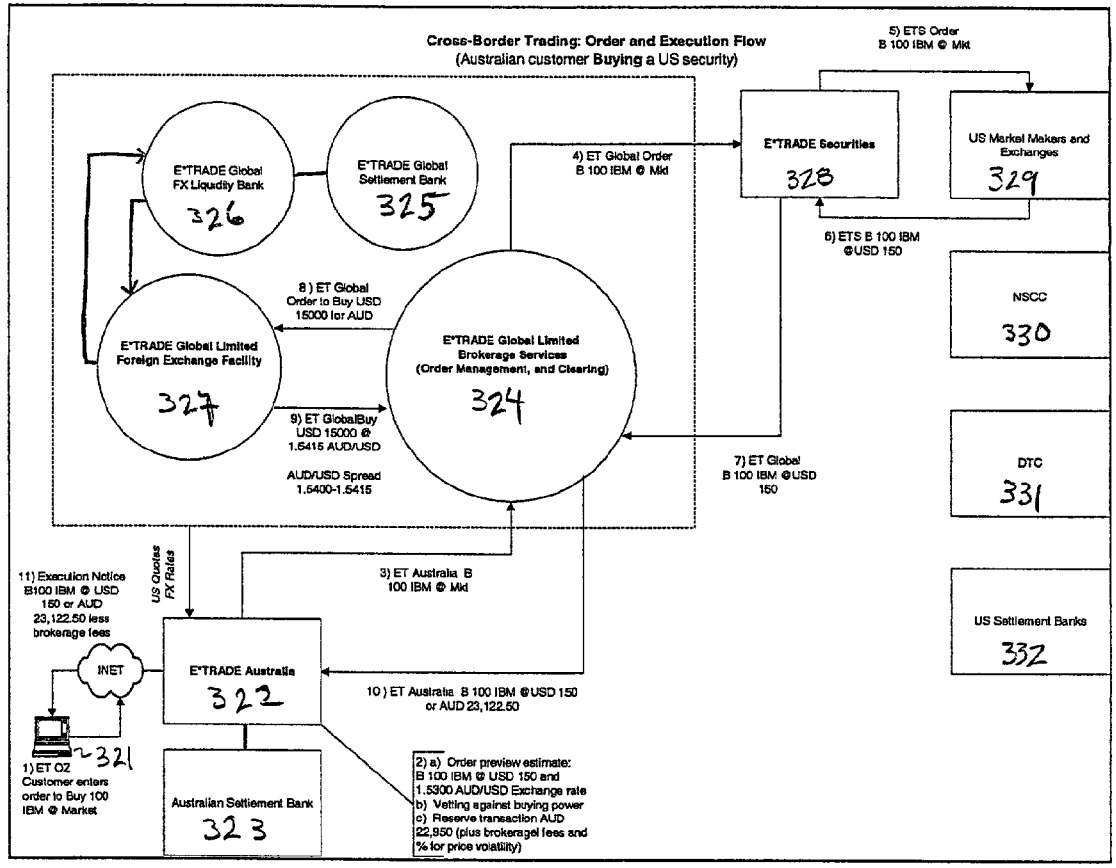
FIGS. 3A and 3B are flow diagrams illustrating cross-border trading order and execution flow for buying a security.
Figure 3B:
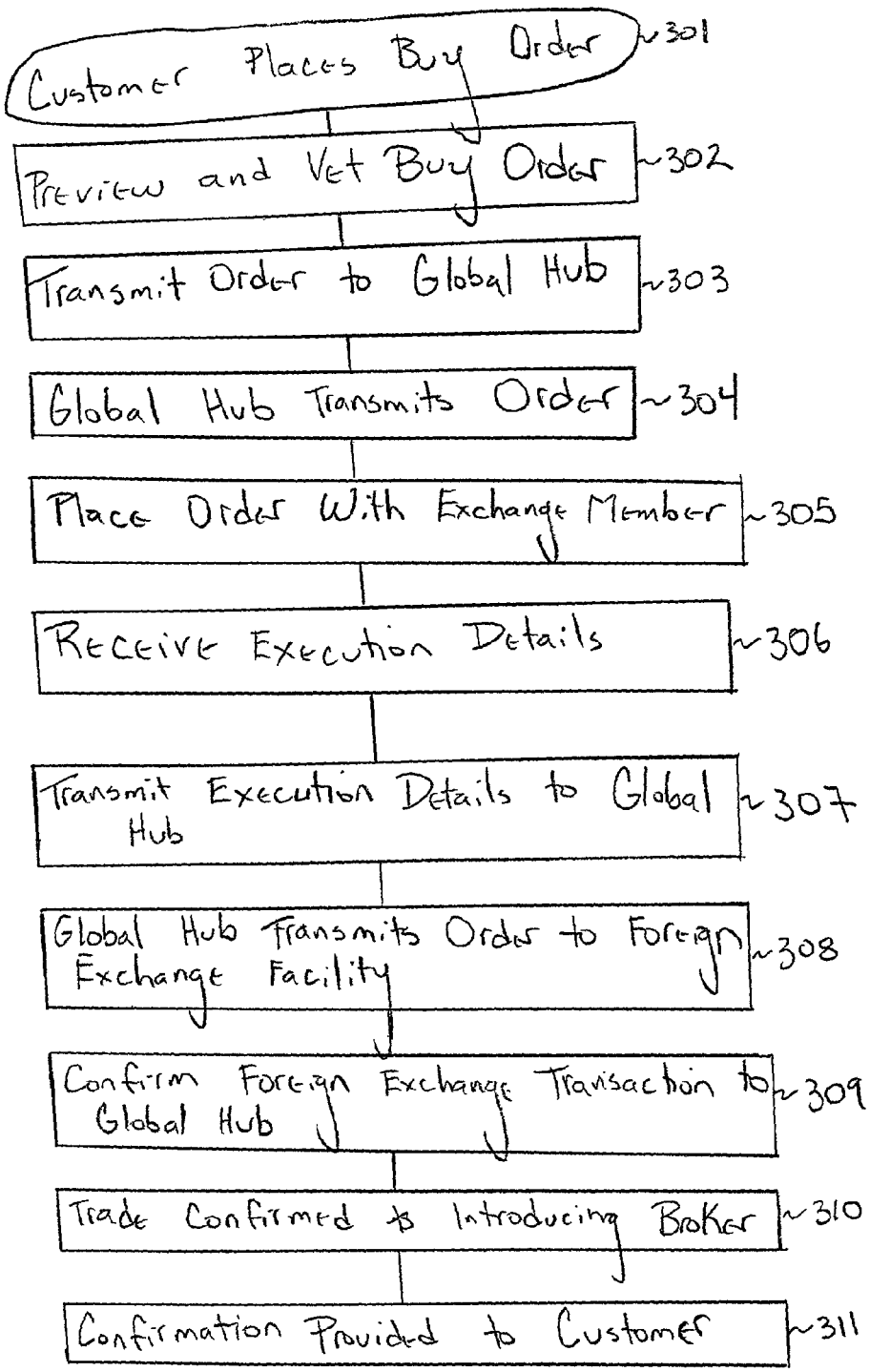

Each cross-border trade potentially consists of two transactions: the equity transaction and the foreign exchange transaction. FIGS. 3A and 3B illustrates the cross-border trading and execution flow for, e.g., an Australian customer buying a U.S. security. An Australian introducing affiliate 322 connects to a customer 321, and the Australian settlement bank 323. Introducing affiliate 322 also connects to the Global Brokerage Service 324, a Global Settlement Bank 325, a Foreign Exchange Liquidity bank 326, and the Foreign Exchange facility 327. Global unit 324 also connects to E*TRADE Securities (an executing affiliate) 328, U.S. Market Makers and Exchanges 329, NSCC (a clearing house) 330, DTC (Depository Trust Corporation) 331, and U.S. Settlement Banks 332. The introducing affiliate preferably does not connect directly to the Global Settlement Bank or Foreign Exchange Liquidity Bank, but instead connects to them only through Global Brokerage Services. Similarly, Global Brokerage Services preferably does not connect directly to the U.S. Market Makers and Exchanges, NSCC, DTC, or the U.S. Settlement Bank, but instead connects through the Executing affiliate. As numbered in the Figures, these units execute a series of steps.

Some time prior to step 301, a customer in Australia receives from E*TRADE Global a preview price on a real-time basis for a U.S. equity (such as an individual stock or mutual fund share). A customer normally is expected to place orders based on the currency of the target market in which the security trades. A price in the native currency may also be provided, with this price being based on both the real-time quote for price on the U.S. equity, as well as a real-time conversion from the foreign exchange rates. In any case, the estimated prices are computed automatically through, by, or with information obtained through E*TRADE Global. At step 301, the E*TRADE Australia customer places a buy order for 100 shares of IBM stock at the market price. This may be done over the internet, with a presentation to the user that should be similar to the way trades are currently placed over the internet in a customer's home market. The customer places the order with a cost estimate based on the real-time quotes for the security. At step 302, E*TRADE Australia provides a preview of the order and vets against the buying power of the customer to reserve the sum of the principal amount calculated in U.S. dollars (USD) based on the current U.S. ask price, the Australian dollar (AUD) equivalent based on the current ask price for USD based on the USD principal amount, the estimated commissions and fees for a cross-border trade to the US and an additional "reserve" over the previous amounts to allow for fluctuations in both the US equity and USD/AUD currency market. At step 303, E*TRADE Australia transmits the order for 100 shares of IBM at the market price to E*TRADE Global. E*TRADE Global sees the order only as an E*TRADE Australia order, and determines that it should be routed to its US agent, E*TRADE Securities. At step 304, E*TRADE Global transmits the order to E*TRADE Securities (ETS), the U.S. local affiliate. At step 305, ETS places an order with an exchange member such as a U.S. market maker in a U.S. exchange, who then executes the trade. Alternately, E*TRADE Global could be registered in a country's exchange, allowing E*TRADE Global to execute the trade directly. After the equity order is executed, ETS receives the execution details at step 306. At step 307, at time T+3 (i.e. settlement date of equity transaction) ETS transmits the execution details to E*TRADE Global. Preferably immediately after the equity order is executed and reported to E*TRADE Global, E*TRADE Global transacts a foreign exchange order prior to confirming the trade back to E*TRADE Australia in step 310. At step 308, E*TRADE Global transmits an order to the foreign exchange facility to sell Australian dollars. At step 309, the foreign exchange facility confirms the FX deal to E*TRADE Global. Because of the timing of step 307, it is assumed that the foreign exchange facility can match the value date of the currency transaction to the settlement date of the security transaction. At step 310, the trade is confirmed to E*TRADE Australia with the USD execution price and principal amount as well as the locked-in AUD value of the trade. At step 311, E*TRADE Australia gives confirmation to the customer of the purchase. This confirmation includes E*TRADE Australia's commissions and fees.

Figure 4A:
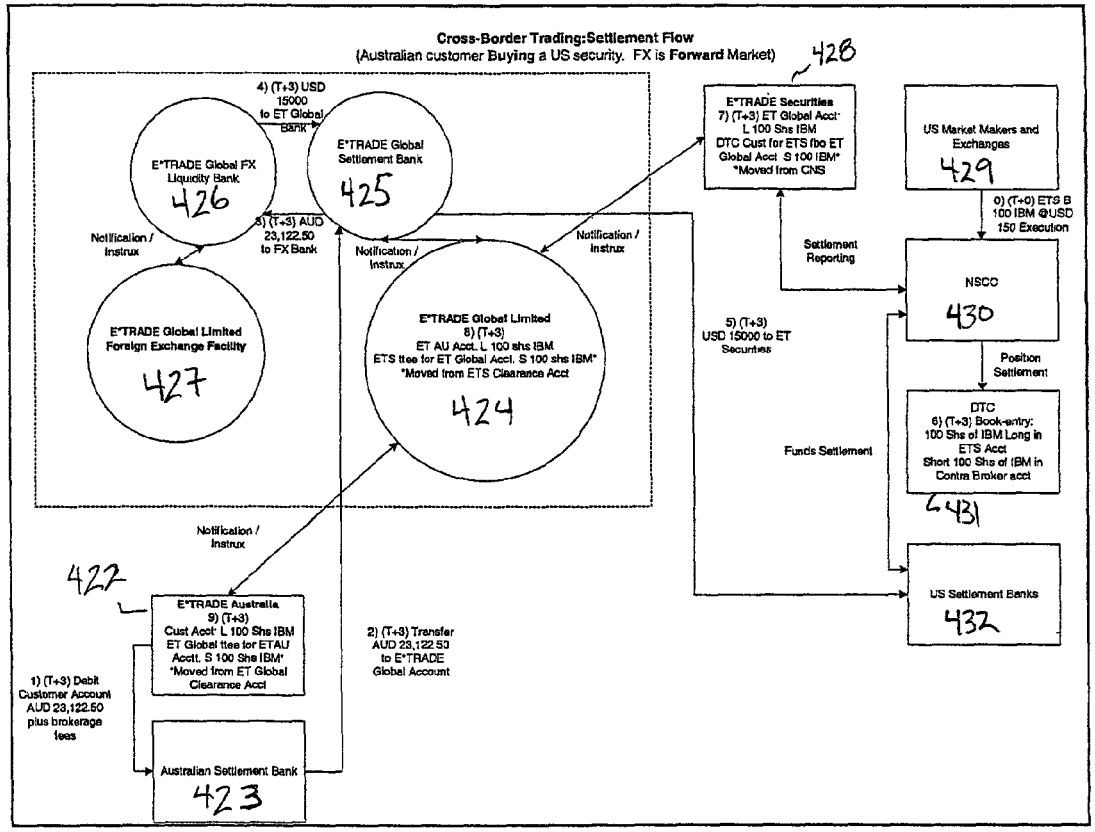
FIGS. 4A and 4B are flow diagrams illustrating cross-border trading settlement flow for buying a security where the foreign exchange is the forward market.
Figure 4B:
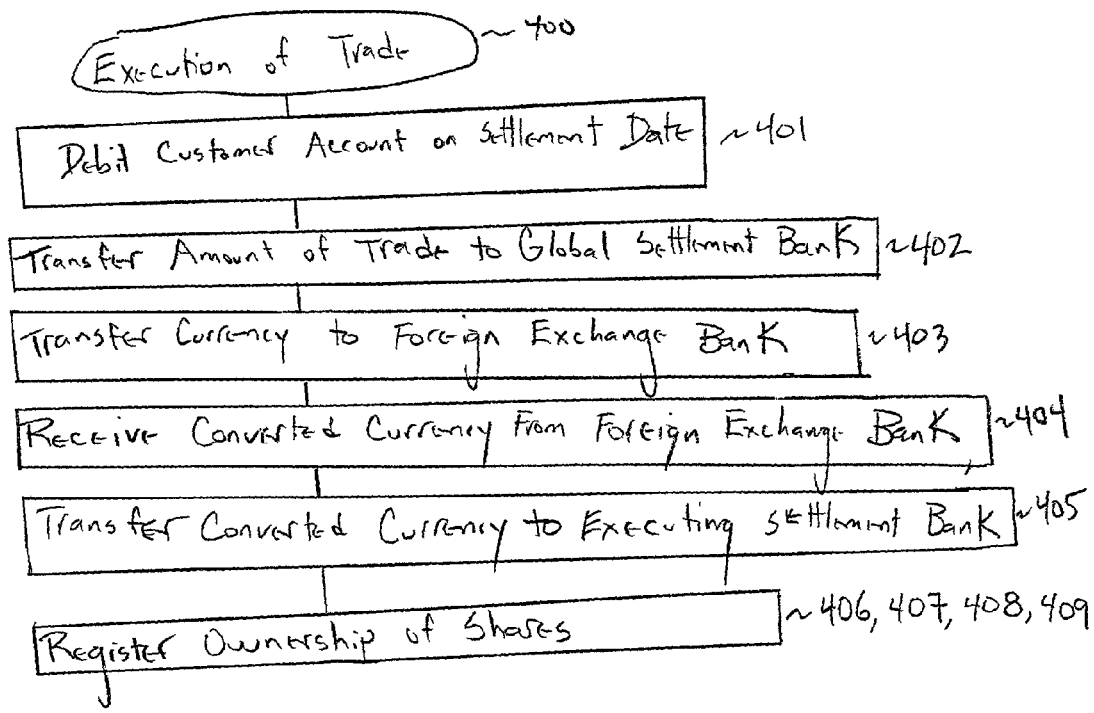

The details of the settlement flow for a customer buying a cross-border security depend on whether the foreign exchange is done in the forward market or in the spot market. Continuing the example of an Australian customer buying U.S. stocks, FIGS. 4A and 4B illustrate the series of transactions involved for cross-border trading settlement flow for an Australian customer buying the U.S. security, with the foreign exchange being executed in the forward market. An Australian introducing affiliate 422 connects to Australian settlement bank 423. Introducing affiliate 422 also connects to the Global Brokerage Service 424, a Global Settlement Bank 425, a Foreign Exchange Liquidity bank 426, and the Foreign Exchange facility 427. Global unit 424 also connects to E*TRADE Securities (an executing affiliate) 428, U.S. Market Makers and Exchanges 429, NSCC (a clearing house) 430, DTC (Depository Trust Corporation) 431, and U.S. Settlement Banks 432. The introducing affiliate preferably does not connect directly to the Global Settlement Bank or Foreign Exchange Liquidity Bank, but instead connects to them only through Global Brokerage Services. Similarly, Global Brokerage Services preferably does not connect directly to the U.S. Market Makers and Exchanges, NSCC, DTC, or the U.S. Settlement Bank, but instead connects through the Executing affiliate. As numbered in FIG. 4A, these units execute a series of steps.

At step 400, the trade is consummated in the relevant stock exchange at time T+0, (to remain consistent with the hypothetical, in the U.S.). At this time, the customer account is encumbered or flagged the value of the trade with the expectation that the settlement of the trade will be completed. On the settlement date, typically three days after the trade date (i.e. T+3), a number of activities occur. At step 401, the Australian customer's account is debited the value of the trade on the settlement date (plus brokerage fees), in Australian currency. E*TRADE Australia sends instructions to its settlement bank prior to settlement date depending on its bank's cut-off times for such instructions. At step 402, the Australian settlement bank transfers the principal amount of the trade in Australian dollars to E*TRADE Global's settlement bank (Australian currency sub-account). At step 403, the global settlement bank sends the Australian dollars to the global foreign exchange liquidity bank, and receives back an equivalent amount of U.S. dollars at step 404. At step 405, E*TRADE Global settlement bank transfers USD to E*TRADE Securities settlement bank to settle the trade. The U.S. settlement bank then pays the clearing house (NSCC) in the U.S., which registers the ownership of the purchased shares in the E*TRADE account in the U.S. at step 406. At step 407, E*TRADE Securities registers the purchase as well for the benefit of E*TRADE Global. Step 408 includes the registering of this trade in the omnibus account at E*TRADE Global. Finally, at step 409, the transaction is registered in the local affiliate account on behalf of the end customer. As a general rule, these activities each occur on the settlement date and therefore need not be executed in the order shown.

Figure 5A:
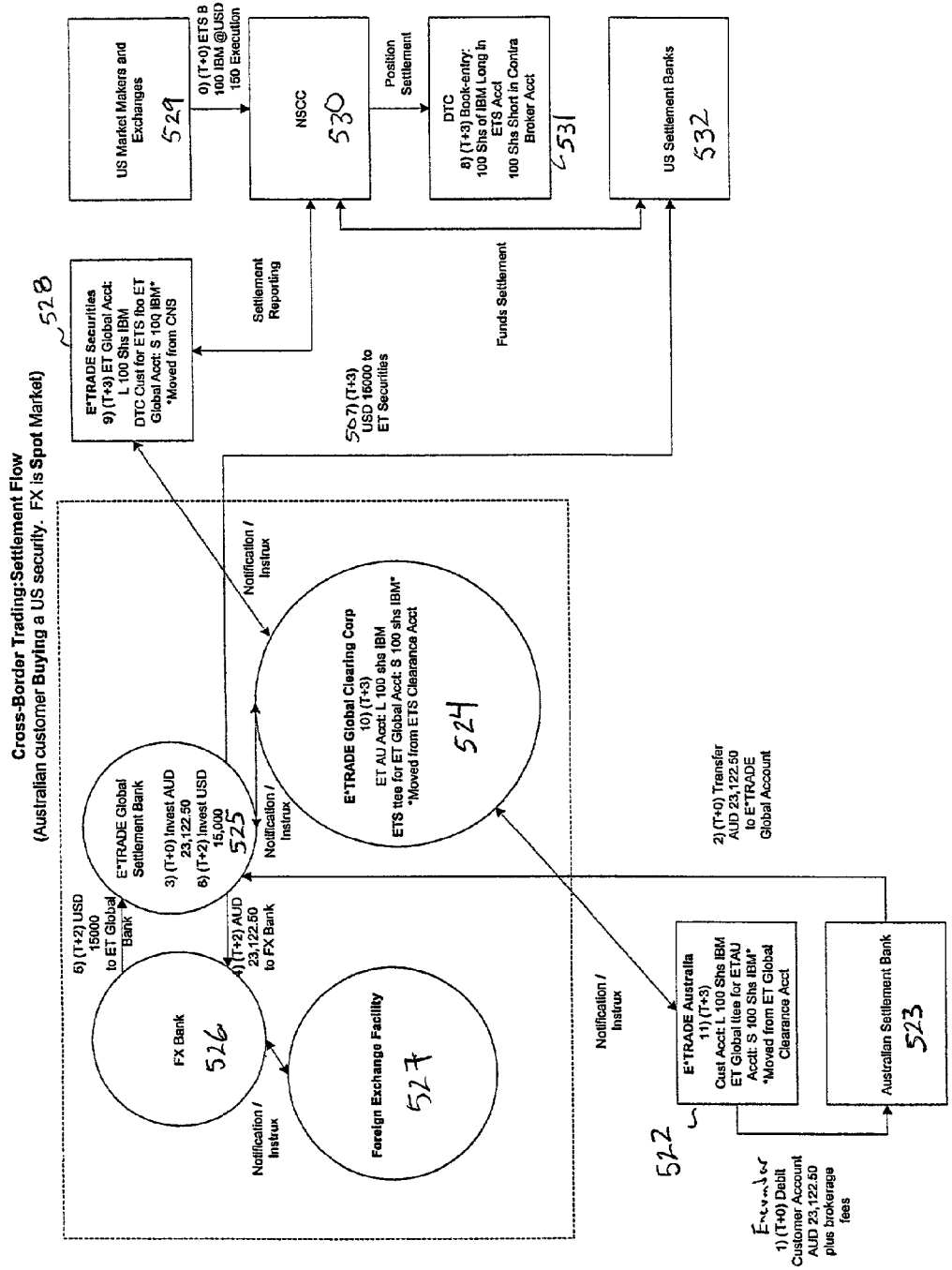
FIGS. 5A and 5B are flow diagrams illustrating cross-border trading settlement flow for buying a security where the foreign exchange is the spot market.
Figure 5B:
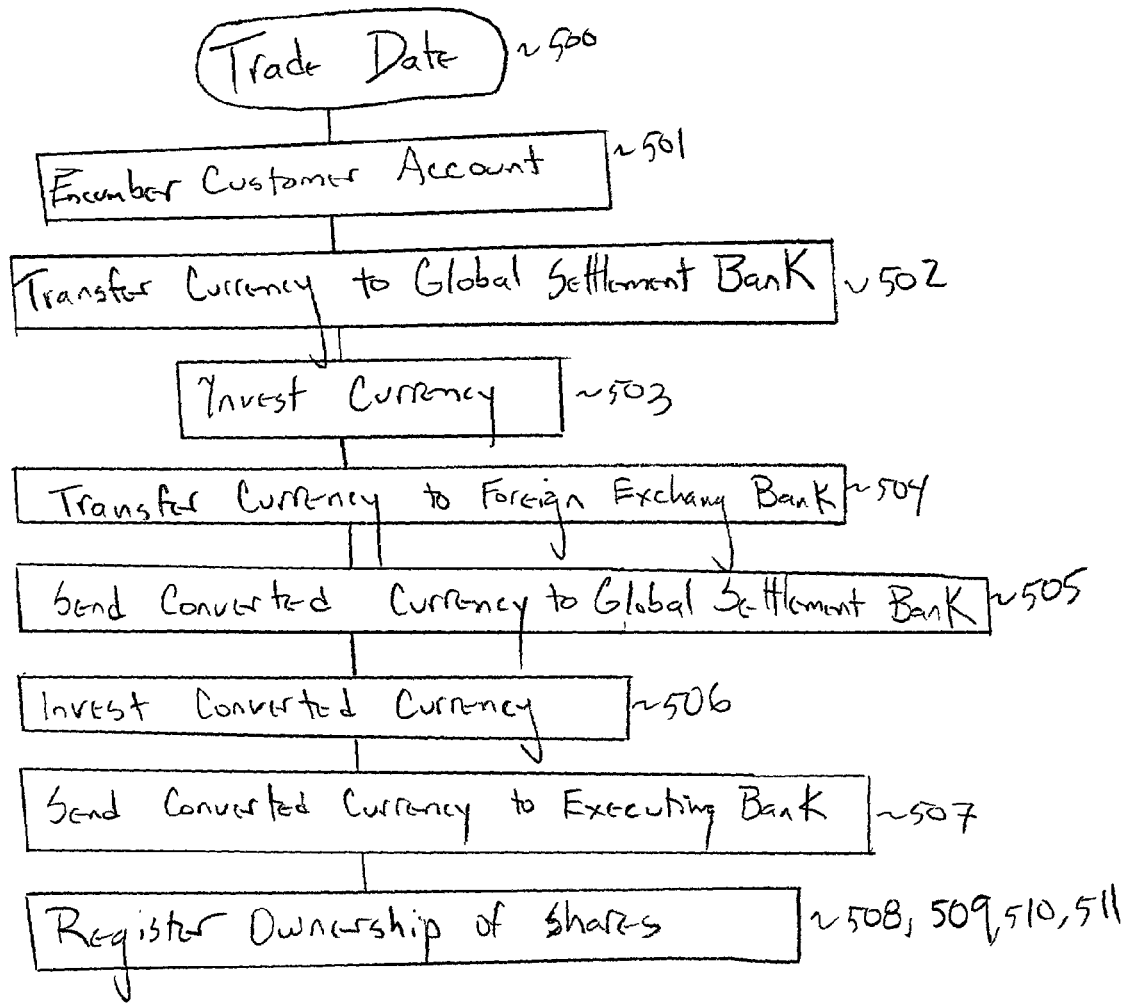

FIGS. 5A and 5B show the series of steps for settlement flow when the customer is buying a security and the foreign exchange is the spot market. An Australian introducing affiliate 522 connects to the Australian settlement bank 523. Introducing affiliate 522 also connects to the Global Brokerage Service 524, a Global Settlement Bank 525, a Foreign Exchange Liquidity bank 526, and the Foreign Exchange facility 527. Global unit 524 also connects to E*TRADE Securities (an executing affiliate) 528, U.S. Market Makers and Exchanges 529, NSCC (a clearing house) 530, DTC (Depository Trust Corporation) 531, and U.S. Settlement Banks 532. The introducing affiliate preferably does not connect directly to the Global Settlement Bank or Foreign Exchange Liquidity Bank, but instead connects to them only through Global Brokerage Services. Similarly, Global Brokerage Services preferably does not connect directly to the U.S. Market Makers and Exchanges, NSCC, DTC, or the U.S. Settlement Bank, but instead connects through the Executing affiliate. As numbered in the Figure, these units execute a series of steps.

At step 500, the trade is consummated in the relevant stock exchange, (to remain consistent with the hypothetical, 100 shares of IBM stock in a U.S. stock exchange). At step 501, the Australian customer's account is encumbered (i.e. the amount is reserved in the customer account) in Australian currency the value of the trade on the trade date (i.e. T+0) (plus brokerage fees), immediately after the trade is executed. To comply with regulations, the customer account will not actually be debited until the equity settlement date, typically three days after the trade date, or T+3. E*TRADE Australia also sends instructions to its settlement bank. At step 502, the Australian settlement bank transfers the principal amount of the trade in Australian dollars to E*TRADE Global's settlement bank (Australian currency sub-account). Because the funds in the customer account are not debited until the equity settlement date, the settlement in the spot market as shown in FIG. 5 assumes that E*TRADE Australia through capitalization or borrowings would effectively extend credit to the customer between T+2 and T+3. At step 503, the E*TRADE Global Settlement bank invests the Australian dollars for one day. Alternately, instead of steps 502 and 503, it may be E*TRADE Global that effectively extends the credit to E*TRADE Australia. In any event, at time T+2 (i.e. the spot exchange settlement date), the global settlement bank sends the Australian dollars to the FX bank at step 504. At step 505, the FX bank sends U.S. dollars to the E*TRADE Global settlement bank. The Global settlement bank invests these U.S. dollars for a day at step 506. One day later, at step 507, the US dollars are sent to the US settlement bank. The US settlement bank then pays the clearing house in the U.S., which registers the ownership of the purchased shares in the E*TRADE account in the U.S. at step 508. At step 509, E*TRADE Securities registers the purchase as well for the benefit of E*TRADE Global. Step 510 includes the registering of this trade in the omnibus account at E*TRADE Global. Finally, at step 511, the transaction is also registered in the local affiliate account on behalf of the end customer.

The 100 shares of IBM bought by the Australian customer is reflected by a series of book entries. Security positions are all book entry except at the custodian level. At the Depository Trust Company 100 shares of IBM long are recorded to the E*TRADE Securities account, and are recorded short at the contra broker's account. At E*TRADE Securities, a book entry is made reflecting 100 shares of IBM held in a segregated account for the benefit of (FBO) E*TRADE Global. At E*TRADE Global, a book entry reflects 100 shares of IBM held in the E*TRADE Australia omnibus account, with an offsetting short to an E*TRADE Securities Trustee account. At E*TRADE Australia, a book entry reflects 100 shares of IBM in the customer's account, with an offsetting short to an account with E*TRADE Global as trustee.

Figure 6A:
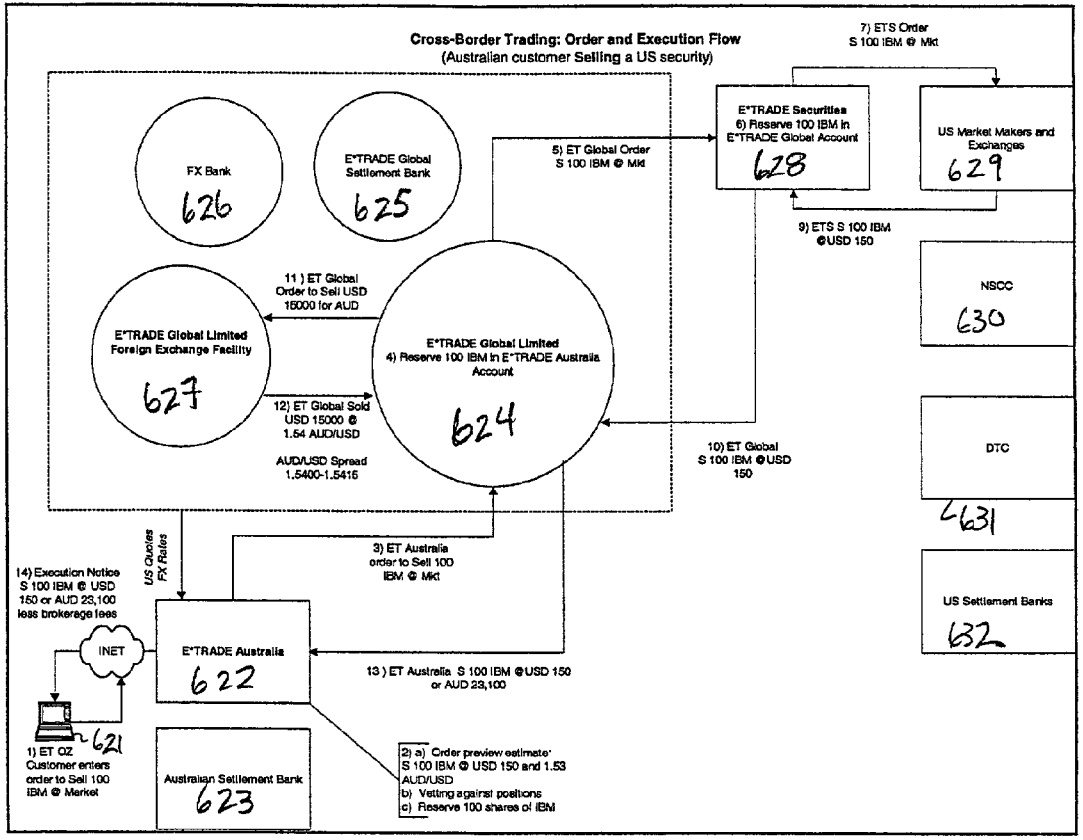
FIGS. 6A and 6B are flow diagrams illustrating cross-border trading order and execution flow for selling a security.
Figure 6B:
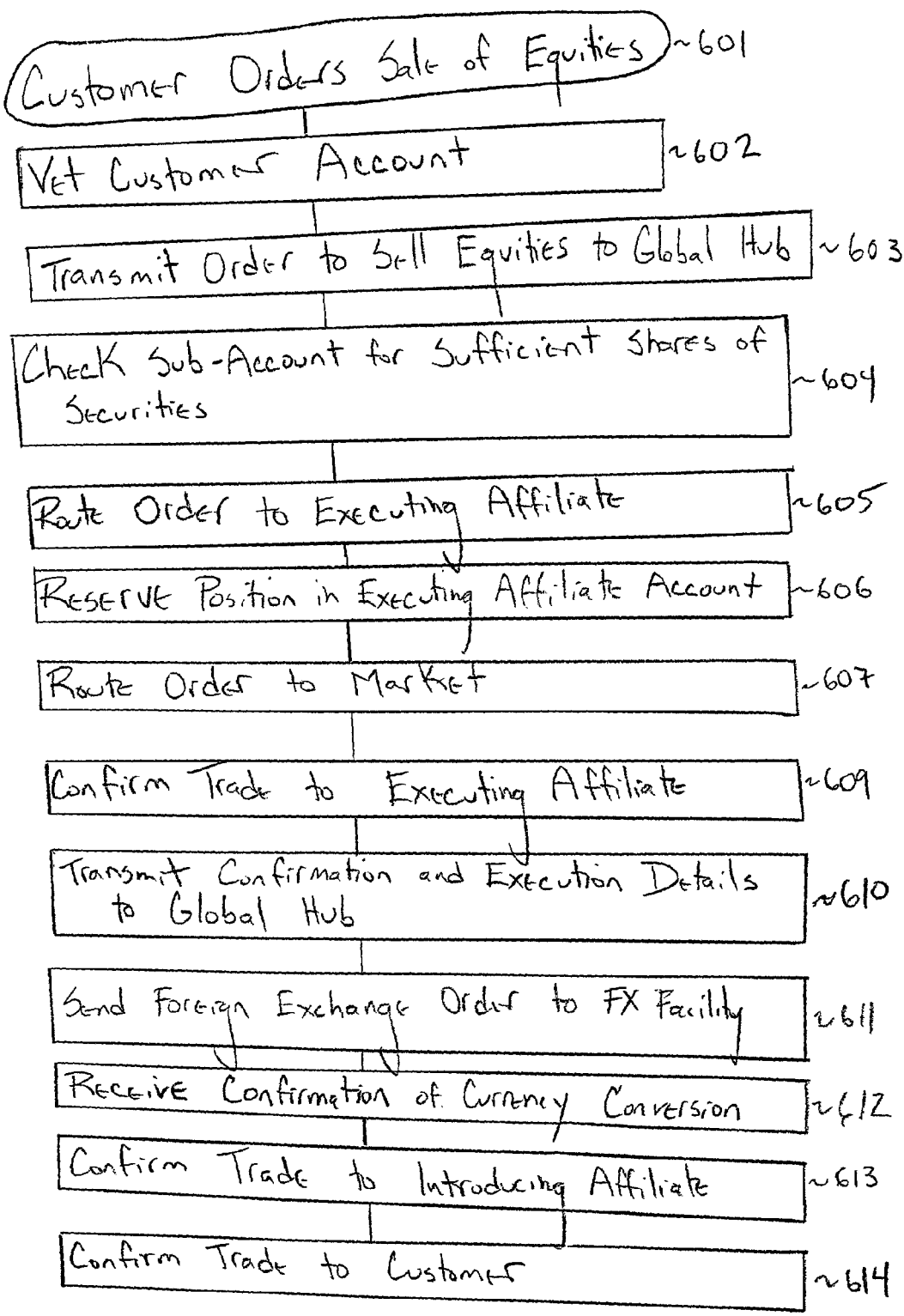

On the sell side, the sequence of steps is somewhat different than on the buy side. Referring to FIGS. 6A and 6B, an Australian introducing affiliate 622 connects to a customer 621, and the Australian settlement bank 623. Introducing affiliate 622 also connects to the Global Brokerage Service 624, a Global Settlement Bank 625, a Foreign Exchange Liquidity bank 626, and the Foreign Exchange facility 627. Global unit 624 also connects to E*TRADE Securities (an executing affiliate) 628, U.S. Market Makers and Exchanges 629, NSCC (a clearing house) 630, DTC (Depository Trust Corporation) 631, and U.S. Settlement Banks 632. The introducing affiliate preferably does not connect directly to the Global Settlement Bank or Foreign Exchange Liquidity Bank, but instead connects to them only through Global Brokerage Services. Similarly, Global Brokerage Services preferably does not connect directly to the U.S. Market Makers and Exchanges, NSCC, DTC, or the U.S. Settlement Bank, but instead connects through the Executing affiliate. As numbered in the Figure, these units execute a series of steps which show the order and execution flow for a sale of a U.S. security Prior to step 601, the E*TRADE Australia system will provide to the Australian customer a preview of the order with estimated proceeds based on the principal amount calculated in USD based on the current US bid price, the AUD equivalent based on the current bid price for USD based on the USD principal amount, less the estimated commissions and fees for a cross-border trade to the U.S. At step 601, the customer decides to sell his equities. At step 602, E*TRADE Australia will vet the order for an existing position in the customer's account and will reserve that position. At step 603, E*TRADE Australia transmits to E*TRADE Global the order to sell the shares. At step 604, the E*TRADE Global system, when it receives the trade order, will check that the E*TRADE Australia sub-account holds sufficient shares of the security and will reserve that amount prior to routing the order to E*TRADE Securities (U.S.). At step 605, E*TRADE Global routes the trade order to E*TRADE Securities. At step 606, E*TRADE Securities reserves the position in its account. At step 607, E*TRADE Securities routes the order to the market. At step 608, the trade is executed. At step 609, the transaction is confirmed to E*TRADE Securities. Step 610 includes transmitting the confirmation and execution details to E*TRADE Global. At step 611, and after the equity order is executed, E*TRADE Global transacts a foreign exchange deal prior to confirming the sale of the equity back to E*TRADE Australia. Step 611 includes sending an order to the Global FX facility to sell U.S. dollars for Australian dollars. At step 612, the foreign exchange bank confirms the foreign exchange dealwith the Australian dollar counter amount to E*TRADE Global. At step 613, the trade is confirmed to E*TRADE Australia with the USD execution price and principal amount as well as the locked-in AUD value of the trade. At step 614, the final confirmation to the E*TRADE Australia customer will net out E*TRADE Australia's commissions and fees.

Figure 7A:
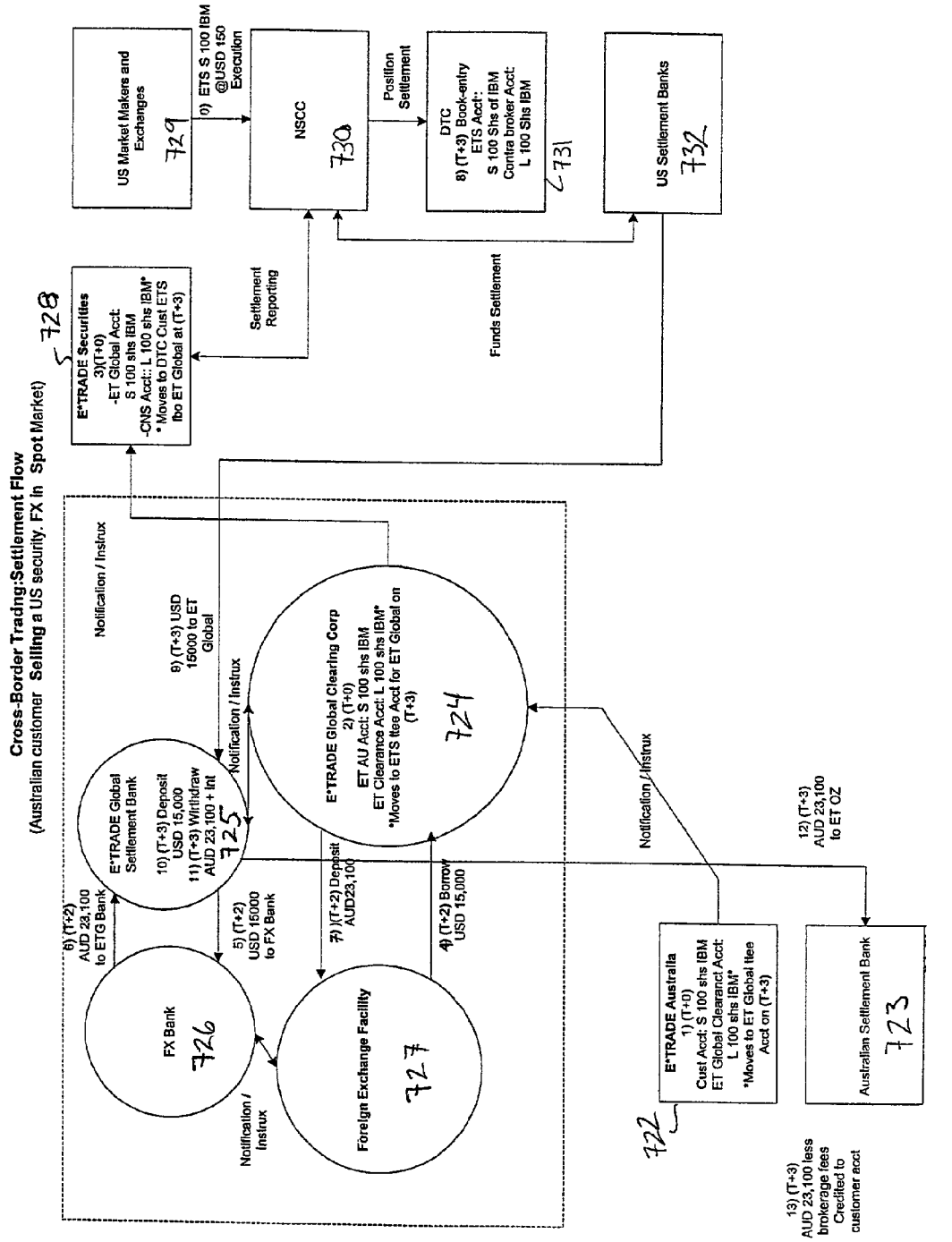
FIGS. 7A and 7B are flow diagrams illustrating cross-border trading settlement flow for selling a security where the foreign exchange is the spot market.
Figure 7B:
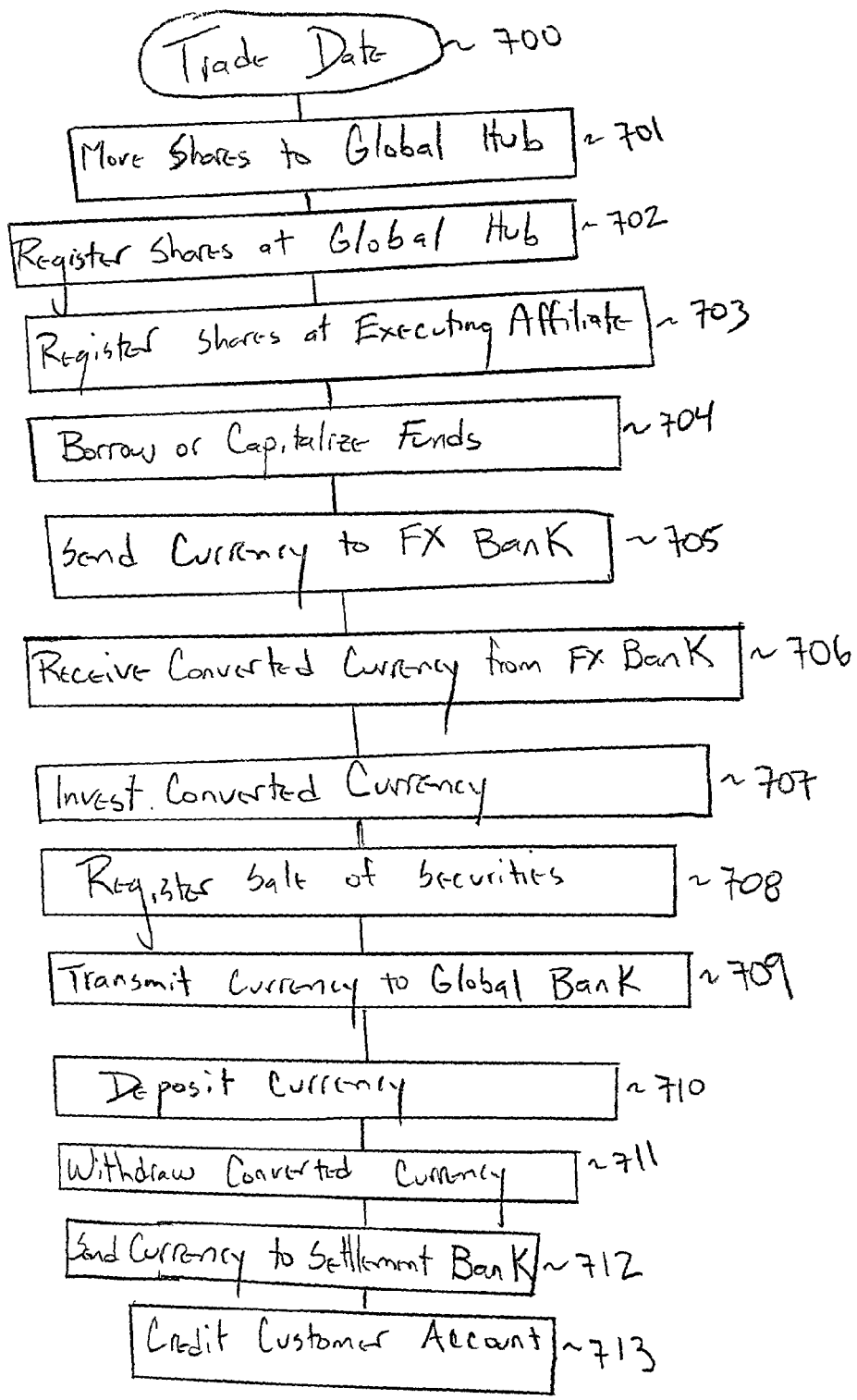

FIGS. 7A and 7B show greater detail for the settlement flow for a sale of a U.S. security with the foreign exchange being executed in the spot market. An Australian introducing affiliate 722 connects to a customer 721, and the Australian settlement bank 723. Introducing affiliate 722 also connects to the Global Brokerage Service 724, a Global Settlement Bank 725, a Foreign Exchange Liquidity bank 726, and the Foreign Exchange facility 727. Global unit 724 also connects to E*TRADE Securities (an executing affiliate) 728, U.S. Market Makers and Exchanges 729, NSCC (a clearing house) 730, DTC (Depository Trust Corporation) 731, and U.S. Settlement Banks 732. The introducing affiliate preferably does not connect directly to the Global Settlement Bank or Foreign Exchange Liquidity Bank, but instead connects to them only through Global Brokerage Services. Similarly, Global Brokerage Services preferably does not connect directly to the U.S. Market Makers and Exchanges, NSCC, DTC, or the U.S. Settlement Bank, but instead connects through the Executing affiliate. As numbered in FIG. 7A, these units execute a series of steps.

Prior to step 700, the E*TRADE Australia system will provide to the Australian customer a preview of the order with estimated proceeds based on the principal amount calculated in USD based on the current US bid price, the AUD equivalent based on the current bid price for USD based on the USD principal amount, less the estimated commissions and fees for a cross-border trade to the U.S. If the customer decides to sell his equities, E*TRADE Australia will vet the order for an existing position in the customer's account and will reserve that position. The trade and foreign exchange deals are executed and confirmed at step 700 at time T+0. At step 701 (at time T+3), E*TRADE Australia moves the shares to E*TRADE Global. Step 702 includes registering the shares in the Australian sub-account of the E*TRADE Global system. At step 703, E*TRADE Securities registers the shares. At step 704, two days after the equity order is executed, E*TRADE Global settles the foreign exchange deal with the Foreign Exchange Bank. In particular, E*TRADE Global through capitalization or borrowing puts up U.S. dollars to deliver against Australian dollars. At step 705, the E*TRADE Global Settlement bank sends these U.S. dollars to the foreign exchange bank. In return, the foreign exchange bank sends the amount in Australian dollars to the E*TRADE Global settlement bank at step 706. At step 707, E*TRADE Global invests these Australian dollars for a day. At step 708, on the settlement date, three days after the trade, the trade is book entered in the DTC in the U.S. (or the country where the exchange resides). At step 709, after settling the trade, the US settlement bank transmits the US dollars to the E*TRADE Global settlement bank. At this time during step 710, the US dollars are deposited and at step 711 the Australian dollars are withdrawn. At step 712, Australian dollar funds are sent to to E*TRADE Australia's Settlement Bank. At step 713, funds are credited to the E*TRADE Australia customer net of E*TRADE Australia's commissions and fees.

Figure 8A:
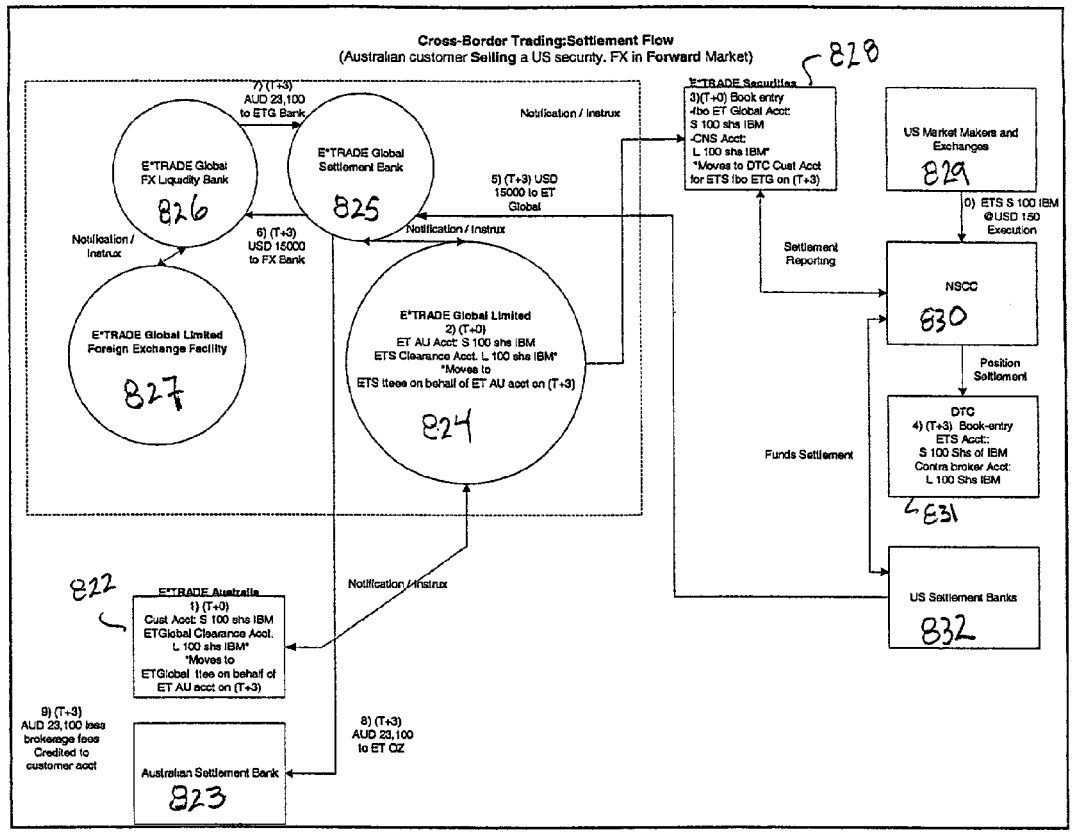
FIGS. 8A and 8B are flow diagrams illustrating cross-border trading settlement flow for selling a security where the foreign exchange is the forward market.
Figure 8B:
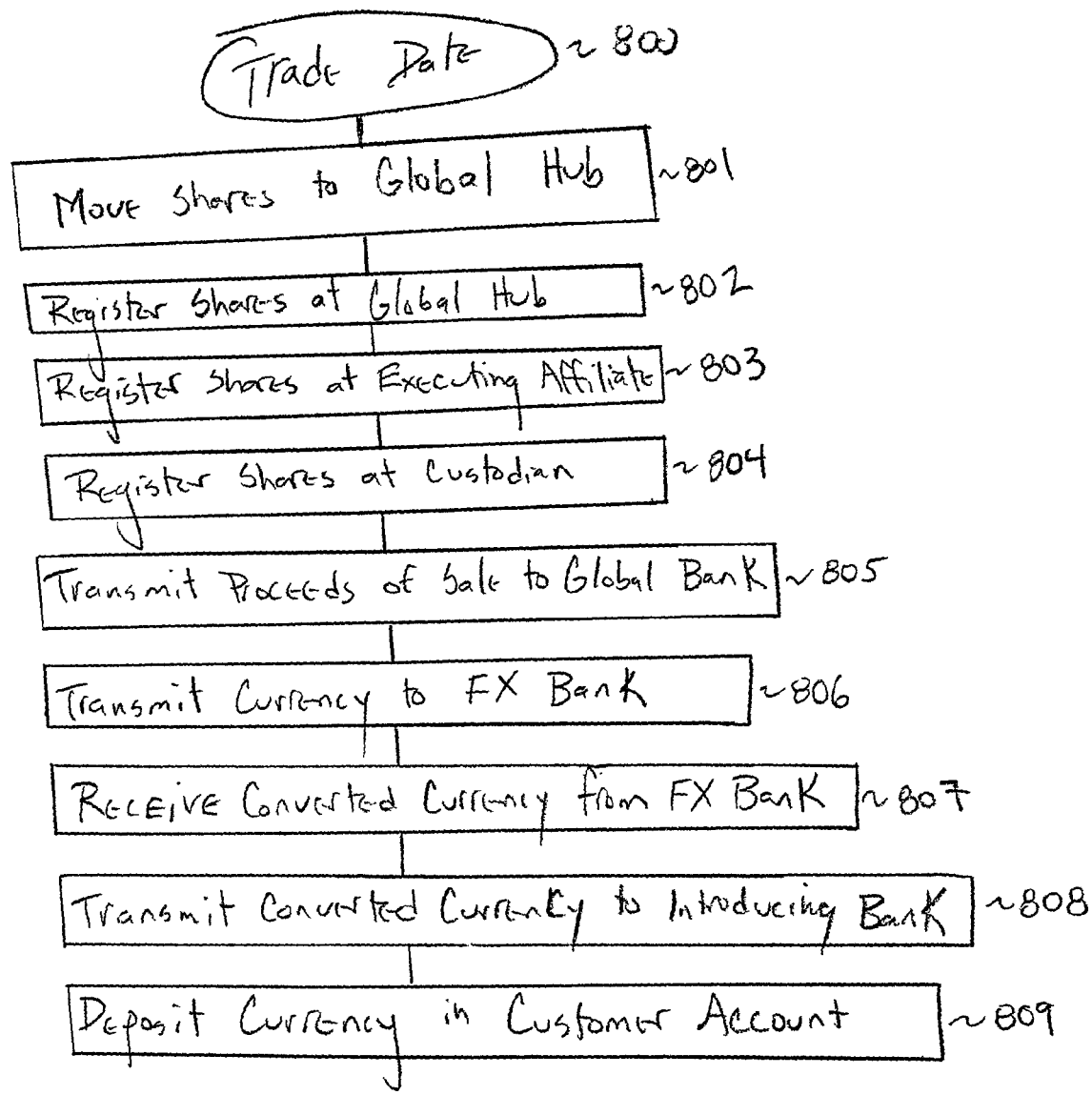

FIGS. 8A and 8B show greater detail for the preferred settlement flow for a sale of a U.S. security with the foreign exchange being executed in the forward market. An Australian introducing affiliate 822 connects to the Australian settlement bank 823. Introducing affiliate 822 also connects to the Global Brokerage Service 824, a Global Settlement Bank 825, a Foreign Exchange Liquidity bank 826, and the Foreign Exchange facility 827. Global unit 824 also connects to E*TRADE Securities (an executing affiliate) 828, U.S. Market Makers and Exchanges 829, NSCC (a clearing house) 830, DTC (Depository Trust Corporation) 831, and U.S. Settlement Banks 832. The introducing affiliate preferably does not connect directly to the Global Settlement Bank or Foreign Exchange Liquidity Bank, but instead connects to them only through Global Brokerage Services. Similarly, Global Brokerage Services preferably does not connect directly to the U.S. Market Makers and Exchanges, NSCC, DTC, or the U.S. Settlement Bank, but instead connects through the Executing affiliate. As numbered in the Figure, these units execute a series of steps.

Prior to step 800, the E*TRADE Australia system will provide to the Australian customer a preview of the order with estimated proceeds based on the principal amount calculated in USD based on the current US bid price, the AUD equivalent based on the current bid price for USD based on the USD principal amount, less the estimated commissions and fees for a cross-border trade to the U.S. If the customer decides to sell his equities, E*TRADE Australia will vet the order for an existing position in the customer's account and will reserve that position. The trade and foreign exchange deals are executed and confirmed at step 800 at time T+0. At step 801, E*TRADE Australia moves the shares to E*TRADE Global. Step 802 includes registering the shares in the Australian sub-account of the E*TRADE Global system at the time of settlement, T+3. At step 803, a book entry is made in the E*TRADE Securities account. At step 804, a book entry is made in the DTC (Depository Trust Corporation) at time T+3 (when the trade has settled). At step 805 (time T+3), the proceeds of the sale in U.S. Dollars (because it was the sale of a U.S. stock) are transmitted to the Global settlement bank. At step 806, the Global Settlement Bank transmits the proceeds in U.S. dollars to the Global Liquidity Bank. At step 807, an equivalent amount of Australian dollars is transmitted back to the Global Settlement Bank. At step 808, the Global Settlement Bank transmits the Australian dollars (minus charges) to the Australian Settlement Bank. At step 809, the money is deposited in the local account of the Australian customer who initiated the sale.

The ability to match the equity and foreign exchange settlement dates is important for a cross-border sale of a security. The spot foreign exchange settlement cycle is typically shorter than the equity settlement cycle, and means that proceeds from the equity transaction will be available at a later date than currency is expected to be delivered. If the foreign exchange transaction is to be executed in the forward market to match the equity settlement date (i.e. three days after the sale), then three days after the sale of the equity, E*TRADE Global will receive the proceeds from the sale from E*TRADE Securities which it will deliver to the foreign exchange bank to settle the currency transaction. In return, AUD (for example) will be delivered to E*TRADE Global which are then transferred by E*TRADE Global to E*TRADE Australia. E*TRADE Australia credits the customer account on the day of the equity settlement date. If the foreign exchange transaction is to be done on the spot market, two days after the sale E*TRADE Global will borrow US dollars for a day to deliver against AUD. E*TRADE Global, however, will be receiving Australian dollars which can be invested between days two and three. Whether this is a net benefit or cost depends on the relative interest levels associated with the USD and AUD.

The sale by the Australian customer is reflected by a series of short book entries. These series of book entries include entries at E*TRADE Australia in the customer's account, with a corresponding long in the account with E*TRADE Global as a trustee, at E*TRADE Global, in the E*TRADE Australia Securities omnibus account with a corresponding entry in the account with E*TRADE Securities as trustee, at E*TRADE Securities, in the E*TRADE Global omnibus account with a corresponding entry in a segregated account for the benefit of E*TRADE Global, and at the Depository Trust Company, and in the E*TRADE Securities account.

One advantage to the system is the use of a Global Foreign Exchange facility and Global Settlement Bank. If each retail broker were to organize or associate itself with a separate foreign exchange bank, economies of scale would be reduced, thus increasing costs. Similarly, a single Global Foreign Exchange facility and Global settlement bank provides negotiating leverage with a foreign exchange bank such as UBS Warburg in obtaining foreign exchange rates. Moreover, because a single foreign exchange facility may be backed and supported by a large corporation such as E*TRADE, it is more likely to obtain better loan rates because it is a better credit risk. These cost advantages may be passed on to the customer, kept by the operator of the system, or split between the two.

E*TRADE Global obtains revenues from the ability to capture spread on the foreign exchange transactions. Profit on the foreign exchange transaction is generated in one of two ways. First, E*TRADE Global may simultaneously buy the currency of the target country at a given price (for example, purchasing USD for 1.5400 from a bank/dealer) and sell to the customer at a slightly higher price (for example, 1.5415). This back-to-back transaction assumes that E*TRADE Global has an adequate liquidity pool arrangement to guarantee that it gets execution on the dealer side of the deal. The potential profits from this arrangement may be higher if the bank side can guarantee interbank rates. Second, E*TRADE Global may take the ask price for the target currency (USD in the example) for the lower price from the dealer (such as 1.5400), but pass the higher ask price (of AUD 1.5415, for example) to the customer. All margins added assume that the ending rate to the customer remains better than the retail rate available at a commercial bank, with the profit margin to E*TRADE Global being dictated by the available rates. The amount of profit generated by the currency transaction will depend on the currency pair being transacted and the relative economic parameters affecting them; the size of the transaction (the best FX rates in the foreign currency market are inter-bank rates reserved for the $1 million plus transactions, with the expected transactions for E*TRADE Global being significantly smaller), the degree to which dealer or banks can provide tradable quotes at or close to the interbank rate, and the mark-up E*TRADE Global decides to apply to the quote it passes to the introducing broker.

E*TRADE Global also earns interest income from investing its reserves. E*TRADE Global may also earn potential investment income from any mismatch of currency and equity settlement dates.

E*TRADE Global also obtains revenue from clearing, with the revenue being based on mark-up over operating costs. Each of the affiliates in the network obtains revenue through standard mark-ups over cost charged to E*TRADE Global as the executing affiliate, brokerage fees to the customer as the introducing broker for foreign orders, and a percentage of the profit generated in the foreign exchange transaction as the introducing broker. Other commissions and transaction charges include commissions charged by the introducing broker to its own client. These will be reflected in the contract note (confirmation) to the end-client. E*TRADE Global will have a transaction charge which it will bill the introducing broker on a regular basis (e.g. monthly). This should be built per transaction but will not accompany the transaction record. The back office for E*TRADE Global should be able to handle this fee schedule separate from the transaction.

E*TRADE Global may share profits from the foreign exchange transactions with the introducing broker. This will not be part of the trade record passed back to the introducing broker but should be built transaction by transaction, separately. As with revenues, the total due to an affiliate will be paid on a regular basis. There may also be other fees or other charges that will be reported with each trade record from the executing broker, through E*TRADE Global, through the introducing broker and on to the client. The U.S. Securities and Exchange Commission (SEC) fee on sales, for example, may need to be reflected in the end-customer's contract note. Another potential item is tax withheld on sales. Other transaction fees might include a service bureau charge per trade, a floor brokerage charge per equity transaction, NSCC (National Securities Clearing Corporation) and DTC (Depository Trust Corporation) fees per transaction, clearing costs, systems cost, and stamp duties (as required by countries). These items would also need to be part of the foreign exchange conversion.

In addition to transaction-based fees, as an executing broker, each affiliate would pass through any maintenance fees associated with maintaining positions for the global network. Examples using E*TRADE Securities would include custodial fees at the depository, account maintenance charges levied by a service bureau, and electronic file transmission fees for daily activity, dividend announcements, reorganization announcements, proxies, voluntary corporate actions, TOAs (transfer of accounts), statement files, and confirmation files. Special handling fees that may be incurred include fees associated with failed transactions or late settlement, transfer of account fees from custodians, requests for certificates (registration of physical securities), and physical stock transfers. E*TRADE Global will charge the introducing broker a transaction fee (based on the country and type of transaction) and a maintenance and custody fee (dependent upon the portfolio mix of the affiliate's omnibus account). Special fees to the affiliates include penalty fees for non-timely receipt of funds, excessively low funds, or excessive reconciliation issues that reflect a service level problem.

Figure 9:
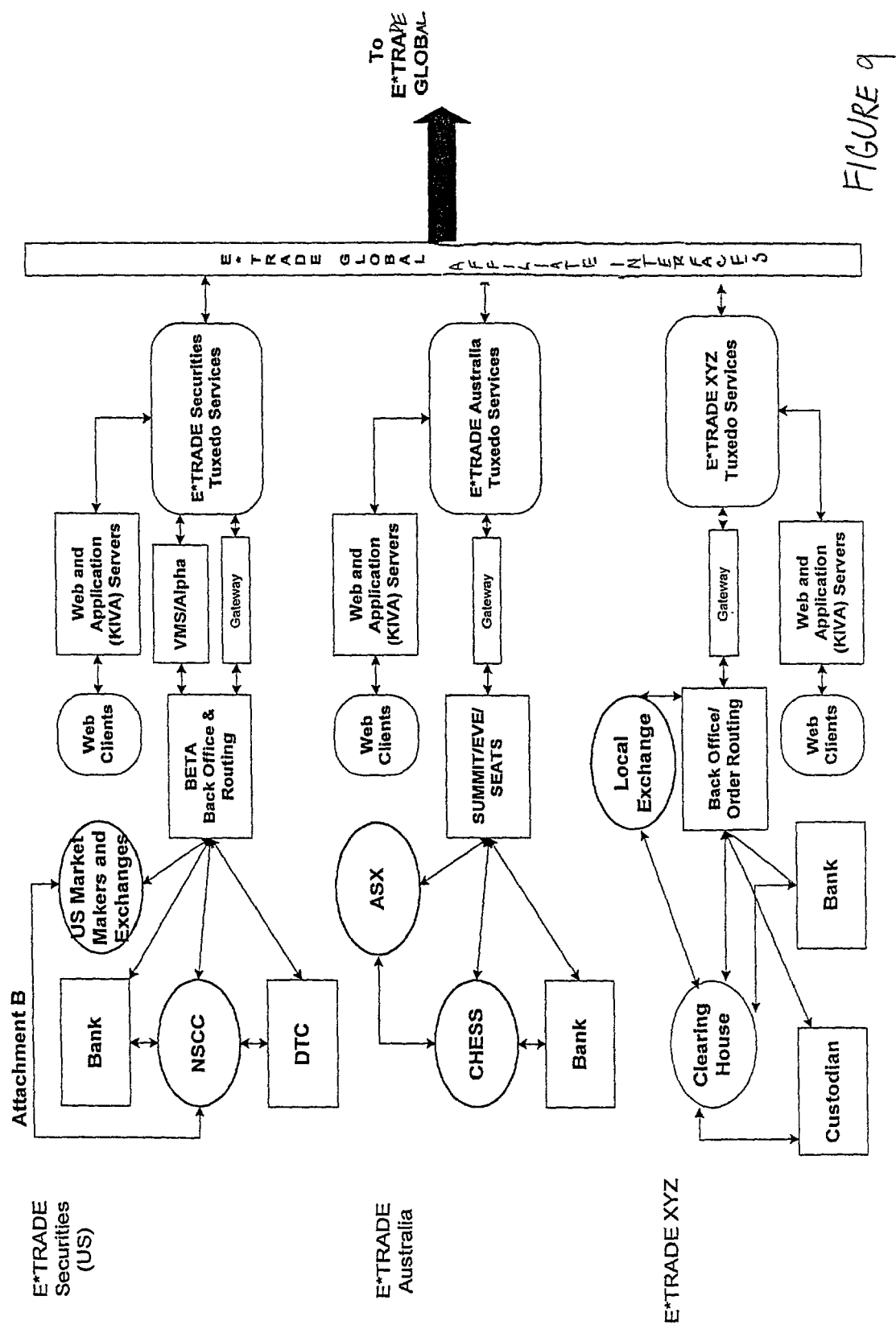
FIG. 9 is a block diagram illustrating the preferred elements of local affiliates.
Figure 10:
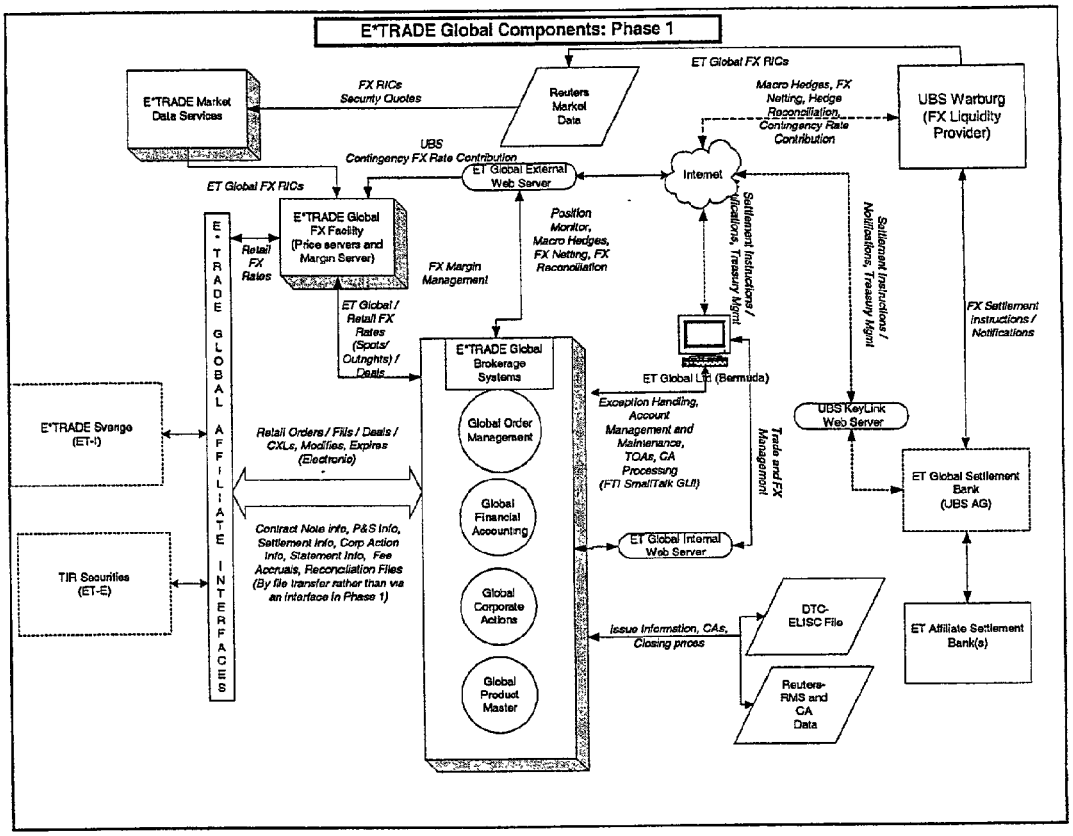
FIG. 10 is a block diagram with illustrating information flow for an exemplary computer network constructed according to the preferred embodiment.

Although the above examples illustrate many of the useful aspects of the invention, they do not capture the full breadth of responsibilities of the parties in the network. Referring to FIGS. 2, 9, and 10, at the local affiliate level, the network includes E*TRADE Securities (US), E*TRADE Australia, and E*TRADE XYZ (a non-specific country). E*TRADE Securities (US) includes a transaction clearing agent (NSCC) connected to a depository (DTC), a bank, and the U.S. market makers who actually execute the trades in the stock exchange. The clearing agent also connects to back office and routing services, which in turn connect through various middleware applications and software (such as E*TRADE Securities TUXEDO Services and E*TRADE Global TUXEDO Services) to E*TRADE Global. The back office and routing services also preferably connect directly to the market makers, the bank, and the depository. E*TRADE Australia and E*TRADE XYZ contain similar components.

Referring to FIG. 10, E*TRADE Global includes the local affiliates which interface to E*TRADE Global via a global affiliate interface, which also interfaces to the E*TRADE Global FX facility and its brokerage services systems. The E*TRADE Global FX facility is responsible for the foreign exchange procedures and therefore receives global foreign exchange rates from E*TRADE Market Data Services (which in turn receives foreign exchange quotes from a provider). The E*TRADE Global FX facility also maintains FX Margin management data, and can receives a contingency foreign exchange contribution via a Web Server connected to the internet. The E*TRADE Global FX facility communicates retail foreign exchange rates to each local affiliate through E*TRADE global affiliate interface.

E*TRADE Global brokerage system is comprised of a global order management module, a global financial accounting (GFA) module, a global corporate actions (GCA) module, and a global product master module (collectively with the FX Facility, called E*TRADE Global Limited). The various labels used and how the responsibilities of E*TRADE Global are distributed among different entities is not as important as the role the global hub plays as contrasted to the local affiliates. For example, as represented in FIG. 10, all of these entities can be integrated into a single computer system platform linked by common software (or they may be separate, as desired) and run by a set of computers or processors.

The E*TRADE Global brokerage system exchanges information such as retail foreign exchange rates and deals, order and settlement information with the E*TRADE Global FX facility, and supports exception handling, routing, clearing, settlement, relationship management, and account maintenance information. E*TRADE Global's system receives retail orders, fills, and deals from the local affiliates via the Global affiliate interface, and transmits back contract note information, P&S (Purchase and Sales) information, settlement information, corporate action information, statement information, fee accruals, and reconciliation files. The Global System also supports macro hedges, foreign currency netting, and hedge reconciliation functions via E*TRADE Global Web Server connected to the internet. The E*TRADE Global Web Server exchanges the macro hedges, foreign exchange netting, hedge reconciliation, and contingency rate contribution information with a provider such as UBS Warburg (a foreign exchange liquidity bank that provides foreign exchange rates). Settlement instructions and notifications are exchanged with the E*TRADE Global Settlement bank (which in turn communicates with the E*TRADE affiliate banks through the international banking network, and a foreign exchange provider such as UBS Warburg with whom the E*TRADE Global Settlement bank exchanges foreign exchange settlement instructions and notifications). E*TRADE Global's system also obtains market data such as issue information and closing data from market data sources. Both the E*TRADE FX facility and the E*TRADE Global brokerage systems preferably access global foreign exchange data from UBS Warburg, but the particular data source is not essential, so long as the E*TRADE Global system has access to suitable market and foreign exchange data.

Each local affiliate of the network can act either as an introducing or executing partner or affiliate, and provides a local broker/dealer licensed to execute trades in the local market and a back-office provider to maintain customer books and records. Each local affiliate has or will establish relationships with clients and is responsible for keeping account information for each client. Preferably, as a security measure, client data is handled at the local level and is not passed on to either the E*TRADE Global hub or to an executing affiliate. The servicing and ownership of customer accounts will always remain with the local affiliate broker/dealer, and each customer will need only one account to execute global trading. This also reduces the overhead required at the global level since memory and operating resources are not used maintaining excess customer information. In addition, each local affiliate has or will have established relationships with the entities to provide banking, clearing, settlement, and custody services. This minimizes the potential for error across the network that could arise from differences in language, for example. This also eliminates any need for E*TRADE Global to open branch offices or be registered in each affiliate country, and lowers the costs of set-up, administration, and liability for the business. Each of the brokers or dealers in the network preferably meets stringent standards of conduct, with acceptance of the broker into the network occurring only after it has proven its operational integrity.

A non-exhaustive list of the responsibilities for the introducing broker are: 1) Vetting (i.e. carefully checking) each order received from each customer for adequacy of assets (funds on the buy side, positions on the sell side), compliance with rules governing their customers trading abroad, and compliance with the target market rules; 2) reserving customer assets associated with open orders, the local currency value of the estimated trade in the client's account for the buy side and the position for the sell side; 3) routing vetted orders to E*TRADE Global; 4) adjusting open cross-border orders as necessary to account for foreign exchange fluctuations; 5) maintaining adequate reserve levels for trading volumes and open orders at E*TRADE Global; 6) transferring settlement funds to E*TRADE Global's account on a timely basis based on E*TRADE Global's instructions; 7) reconciling fully-disclosed books and records with the omnibus records transmitted by E*TRADE Global, including transactions, positions and balances; 8) processing and allocating corporate actions from the omnibus account to the individual client such as dividends, stock splits, and other relevant corporate actions, and discussing with the customers the details of each corporate action; 9) notifying customers of information associated with cross border trading such as sending confirmations (contract notes) for cross-border trades as required by local regulations, sending regular statements that include the positions and valuations of foreign security holdings, and distributing proxy statements and other corporate action notifications (which may involve the production by the introducing affiliate of the number of shareholders to determine accurately the number of proxies to be sent); 10) adjusting open limit orders for dividends and splits; 11) maintaining a back office security master that accommodates foreign securities; 12) maintaining books and records that include positions and balances denominated in multiple currencies; 13) transmitting appropriate tax withholding rates for sales with the order record; 14) generating order records differentiating payment currency from settlement currency; and 15) determining the pricing schedule to the local customer for cross-border trades in their local market. This should be consistent with the rest of the global network by accounting for E*TRADE Global's transfer costs, any additional costs to the local broker for maintaining foreign security records, and the competitive environment. With multiple transactions in a day, for each settlement day the introducing broker also aggregates the trades it needs to settle with E*TRADE Global (in, for example, AUD), nets proceeds against payment (in AUD), and ensures that the net amount AUD is forwarded to the E*TRADE Global AUD account (or whichever account applies).

It is the responsibility of the introducing broker to decide on what types of transfers are acceptable (i.e. full transfers versus partial transfers). Any fees associated with incoming/outgoing transfers by the executing broker will be passed on to the E*TRADE Global network, who then pass them on to the introducing broker. Security balances will be passed onto the executing broker for custody and the introducing broker will be responsibility of communicating transfer information to their customers. If a security is domiciled within the network the introducing broker must transfer the security position to the executing broker of which the security is domiciled. For instance, all Australian securities must be given to E*TRADE Australia for custody.

The responsibilities of the executing broker/dealer include: 1) maintaining an omnibus account for E*TRADE Global and segregating its positions; 2) accepting orders on this account on a "versus payment" basis; 3) routing orders for this account for best price execution on a timely basis; 4) adjusting limit orders for dividends and splits; 5) providing execution confirmations and order expiry information electronically to E*TRADE Global; 6) providing corporate action information and allocations for all E*TRADE Global positions; 7) transmitting non-transaction sweeps such as dividend payments; 8) providing trading rules for foreigners in the market to E*TRADE Global; 9) custody securities in a segregated account for the benefit of E*TRADE Global; 10) providing statement information for the E*TRADE Global omnibus account; 11) withholding the appropriate taxes for dividends, interests, and sale proceeds; and 12) processing all corporate actions (reorganizations, dividend pay outs, proxy voting) and notifying E*TRADE Global in a timely manner. E*TRADE Global's back office system should receive a daily free from each of the target markets back office system, with the feed including information in which E*TRADE Global has a position. With multiple transactions in a day, for each settlement day the executing broker also aggregates all trades settling that day (for example, E*TRADE Securities would aggregate all trades settling that day in US dollars), nets proceeds against payments, and ensures that the net amount in USD is forwarded to the US settlement bank from E*TRADE's Global USD account.

The Order Management System, referred to in FIG. 2 as E*TRADE Global Trading, handles the routing and execution reporting of cross-border transactions (securities and currency) to, as needed, the appropriate affiliate and foreign exchange facility. It therefore is responsible for: 1) routing all non-domestic customer securities orders from the introducing broker/dealer to the executing broker/dealer; 2) routing order status (executions and expirations) from the executing broker to the introducing broker/dealer including local currency value of executions; 3) defining which instruments can be traded in the network (for example, only over-the-counter equities might be traded through the system); 4) identifying and defining the destinations for certain types of instruments if it is not one of the affiliate broker/dealers. Currency transactions, for example will be routed to the foreign exchange facility; 5) managing the routing (and re-routing) parameters by instrument including currencies; 6) monitoring order and execution activity, including accompanying foreign exchange transactions; 7) reconciling orders and trades, including foreign exchange; 8) generating a corresponding foreign exchange order on a real-time basis after an equity order executes by differentiating between payment and settlement currencies on an order record; 9) defining and developing the procedures for managing exceptions which occur in the order and execution process; adjusting open orders for corporate actions, expirations, and exercises; 10) monitoring open orders against currency fluctuations and notifying the introducing brokers when this exposure occurs; 11) validating cross-border orders against affiliates' positions and trading limits; 12) routing orders based on parameters per security traded in the Global network; 13) automatically placing any foreign exchange deal after execution of an equity trade; 14) placing speculative foreign exchange transactions for cash management purposes; 15) reconciling trades; 16) managing open orders such as expirations and adjustments for corporate actions; and 17) ordering and filling adjustments. These responsibilities include monitoring each introducing broker's trading activity against the reserves it holds at E*TRADE Global. The reserves for each affiliate will be deposited in US dollars (USD) and, perhaps, US treasuries. Unsettled trades will need to be converted to USD and compared against reserve levels on a regular basis, with an alert when certain thresholds are being approached. E*TRADE Global Limited organized as a company and broker-dealer registered offshore, which allows E*TRADE Global to receive orders and route from the local broker/dealers without being registered in the target country as a broker/dealer.

E*TRADE Global maintains accounts on an omnibus basis. Each of the affiliates will have a separate account as an introducing broker and as an executing broker. With 30 affiliates, there will be approximately 60 dealer accounts in E*TRADE Global plus a variety of posting and nominee accounts. E*TRADE Global, acting as trustee on behalf of the introducing broker, will be represented as a single omnibus account at each executing broker.

Referring to FIGS. 2 and 10, E*TRADE Global also maintains Global Financial Accounting, the Global Corporate Actions, and the Global Product Master modules. E*TRADE Global handles the clearing and settlement of cross-border transactions, global custody of non-domestic securities through a series of nominee/FBO accounts, and corporate action processing. E*TRADE Global's Foreign Exchange Facility handles the currency exchange transactions. E*TRADE Limited will preferably be a separate company, registered offshore as an omnibus broker/dealer holding one account for each introducing affiliate, as well as each executing affiliate. Its offshore registration allows E*TRADE Global Limited to receive orders and route from the local affiliate without registration in the target country. It also has a number of responsibilities, which include: 1) maintaining an omnibus account for each broker/dealer in the E*TRADE Global network; 2) maintaining reserves deposited by each affiliate broker/dealer based on the greater of a set amount (such as USD 100,000), or each affiliate's average cross-border settlement payments multiplied by a given number of days; 3) managing the investment of "excess" cash overnight; 4) enforcing the penalization of late payments by local affiliates; 5) guaranteeing settlement to each executing broker on a net basis daily and in local currency; 6) performing daily trade reconciliation with each executing affiliate; 7) performing daily trade reconciliation with each introducing partner; 8) transmitting confirmation (also called contract note) information including currency equivalents to each affiliate electronically; 9) maintaining and reconciling the daily stock record; 10) transmitting periodic (such as monthly) statement information to each introducing affiliate electronically, with consolidation of all custodian affiliates' records; 11) transmitting corporate action information to each affiliate broker/dealer impacted by the corporate action. Corporate actions include dividends and splits, proxy information, and voluntary actions; 12) allocating and transferring dividend payments to each affiliate broker/dealer and executing the associated currency exchange transactions; 13) adjusting and transmitting stock splits and reverse splits for each affiliate broker/dealer; 14) adjusting the omnibus open limit orders for changes due to dividends and splits; 15) transmitting adjustments to open limit orders for changes due to dividends and splits to the introducing broker/dealer; 16) defining, managing, and enforcing execution and clearing agreements between E*TRADE global and each affiliate broker/dealer; 17) maintaining a consistent fee schedule for transaction to each target market. For example, each local affiliate will be subject to the same fee for each target market (e.g. a U.S. trade will cost the same for any affiliate in the global network), fees will be based on the target broker/dealer cost plus E*TRADE global's cost for the transaction. This will vary from country to country, and fees will be denominated in one base currency (U.S. dollars); 18) providing guidelines for pricing of cross-border trades charged by each affiliate broker/dealer to its customer; 19) maintaining tax withholding matrices for country-to-country withholding rates on dividends, interest, and sales proceeds; 20) repositorying the country trading rules on foreigners trading in domestic markets including withholding tax. Facilitating the distribution of the rules to all affiliate broker/dealers (enforcement of these rules, as well as the rules on local customers trading abroad will be the responsibility of the local affiliate); 21) performing compliance due diligence and regular audits on affiliates to maintain high confidence that E*TRADE Global can maintain an omnibus clearing and trading relationship; 22) identifying and setting up a settlement bank for E*TRADE Global's settlement of funds associated with securities trading (with sub-accounts for currencies); 23) maintaining and generating bank instruction for funds settlement associated with trades by each affiliate; 24) maintaining the accounting records of charges and revenues due to affiliates and E*TRADE Global; and 25) bill, collect, or remit appropriate amounts to each affiliate monthly. With multiple introducing and executing brokers, E*TRADE Global also aggregates trades to an executing broker from others in the network and aggregates the introducing brokers trades to the rest of the network.

The Global Financial Accounting product manages the omnibus accounts per the introducing broker, manages trustee accounts per the executing broker, manages the cash and stock settlement instructions, maintains fee schedules, processes contract notes, processes and allocates corporate actions from executing to introducing affiliates, manages reserves, manages accruals and allocations for fees and foreign exchange margin revenues and associated billing, handles bank settlement instructions, manages foreign exchange settlement instructions, manages foreign exchange profit allocations, executes profit accounting by transaction in the specified currency, and reconciles trades. The Global Product Master product obtains data from Reuters Master Source and DTC and other market data services.

The currency exchange facility or foreign exchange facility provides indicative foreign exchange rates for an order preview, real-time auto-execution of deals associated with security transactions, executable rates and real-time execution for stand-alone foreign exchange trades, and management of foreign exchange spread parameters. With regard to the management of foreign exchange spread parameters, an E*TRADE Global foreign exchange margin is added to the indicative rates and deal rates returned by the liquidity bank to E*TRADE Global. The rates passed to the affiliates will be after this margin has been added. E*TRADE Global Foreign Exchange Facility will provide conversion of payments from the customer currency to the target market currency on the buy side of a security transaction and perform the reverse on the proceeds of a sale. In addition to facilitating and supporting cross-border securities trading, the facility should also be able to support currency trading as a product in its own right. The E*TRADE Foreign Exchange Facility could either be a partner currency exchange facility, or could be in-house within E*TRADE Global. In either case, the E*TRADE Global Foreign Exchange Facility should be able to: 1) support currency pairs to correspond with the cross-border trading markets within the global network (including against the Euro); 2) provide round-the-clock access to real-time currency exchange rates which can be distributed throughout the global network and to the end user to preview a securities trade, as an executable quote for a foreign exchange speculative trade, to update a portfolio, or simply as quotes; 3) accept orders for foreign currency on an electronic and real-time basis; 4) execute foreign exchange transactions immediately after security trade executes (auto accept); 5) allow the specification of value dates on currency transactions to match the equity settlement dates (and avoid the settlement date mismatches which will occur if restricted to spot transactions); 6) differentiate between transactions associated with a securities trade and those which consist of speculative trading in currency pairs; 7) support cash management in multiple currencies (allow deposits and loans); 8) generate revenue for E*TRADE Global while delivering competitive retail rates to the end-customer through allowing management of spreads passed through to the end client by country or through back-to-back executions of currency orders which lock in a spread; 9) provide revenue through the share of the spread or margin on back-to-back executions at inter-bank rates; 10) settle on a net basis per currency with E*TRADE Global; 11) provide electronic reporting of transactions and profits by currency pairs; and 12) allow designation of currency for profit. Because of multiple transactions in any one day, for each settlement date the FX facility also aggregates all trades by currency pair, nets proceeds against payments by currency, and ensures that the net amounts of USD and AUD (for example) are either sent from or credited to the appropriate FX accounts.

The E*TRADE Global Affiliate interface is a software domain that provides an interface between: 1) executing brokers and E*TRADE Global trading, foreign exchange, and clearing services; 2) introducing brokers and E*TRADE Global trading, clearing and foreign exchange services; and 3) E*TRADE Global Trading and clearing systems and the E*TRADE Global Foreign Exchange Facility.

The E*TRADE Affiliate Interface is a software interface service to the affiliate back office, and is suited to handle messages to and from the affiliate as an executing broker, and to and from the affiliate as an introducing broker.

The E*TRADE Global settlement bank handles the cash settlement for equity transactions between E*TRADE global and each affiliate, and instructions to the settlement bank is associated with cash settlement of securities transactions. It also holds a sub-account for each currency, and will custody the cash reserves of E*TRADE Global. All affiliates will be instructed to send net payments to the E*TRADE Global Settlement Account.

The Foreign Exchange Settlement Bank handles the settlement of currency transactions for E*TRADE Foreign Exchange. It should have a sub-account for each currency. The instruction for the sell side and buy side of a currency transaction should merely reflect how different (sub)-accounts at E*TRADE Global's foreign exchange settlement bank. The banks used by E*TRADE Global for equity and FX settlement may be the same and merely have different accounts for different functions.

Various web-based interfaces will be available to the network. E*TRADE Global staff will have user interface screens will be provided for managing the business parameters underlying the different systems, for managing exceptions, for monitoring, for research, for order routing, for setting thresholds for manual review, for setting of spread parameters by currency pair, and for entering an FX deal requires as part of cash management. Certain user interface screens will also be advantageously available to providers, to allow them to monitor currency positions, hedge them, initiate reconciliation files, and agree net settlement balances with E*TRADE Global.

Corporate actions may affect customer positions. Examples of corporate actions that affect customer positions are forward stock splits, reverse splits, name/symbol changes, mergers, tender offers (voluntary and mandatory), exchange offers, rights offerings, warrant exercises, and dividend payout.

Once a corporate action has been announced, the executing broker will notify E*TRADE Global. E*TRADE Global will pass on the information to all introducing brokers affected, along with records and pay dates. For example, for a dividend the executing broker should send a message or file to E*TRADE Global indicating an adjustment in price to all open orders in the security in which a dividend was paid. E*TRADE Global's adjustment to its order file should, likewise, transmit an adjustment on to the introducing broker with impacted open orders. For stock splits, the adjustments should be reflected first in the executing broker's order file and transmitted to E*TRADE Global. E*TRADE Global's adjustment to its order files should be transmitted to the relevant introducing brokers so that their orders are adjusted and clients notified. For a reorganization (name changes, mergers, mandatory tenders), the open orders should be cancelled and the end client notified why. For other corporate actions, on the pay date, the executing broker will reconcile E*TRADE Global's holdings with their depository, and E*TRADE Global will reconcile with the introducing brokers. In some instances, the executing broker does not see the change until a couple of days later. This delay is usually caused by the depository or transfer agents. If the executing broker's balance is not changed on pay date, E*TRADE Global and the introducing brokers position balance will not change as well. This is to avoid overpayment in the case a company does not execute its corporate action. The back offices at E*TRADE Global and at the introducing broker will need the facility to process and allocate global corporate actions based on terms sent to them. If the corporate action is voluntary, the executing broker will notify E*TRADE Global of all voluntary deadlines.

Associated with these transactions are a number of risks. The risks in the invention arise from having two transactions occurring in a cross-border trade (equity and currency) and having to deal with different time zones. For example, when a customer places a market order there are two price risks involved. First, there is the risk that the price of the stock that is being bought or sold will move significantly between the time the order is previewed and placed and the time it is executed. Second, there is the risk that the exchange rate for the currency pair will have changed significantly between the time the order is placed and the time of execution. While these risks are ultimately the customer's, the introducing broker bears some exposure if it doesn't reserve sufficient customer assets to account for the price changes. During the market day, these risks will tend to be minimal since most transactions should execute within seconds. Where the order is in a thinly traded stock, the risk becomes greater. Price and currency exposure can be mitigated by adding a margin on the amount reserved for the open order, such E*TRADE Global reserving 105% of the trade value from the introducing broker's account. Exposure can also be mitigated by initiating and executing the currency exchange transaction immediately after the equity transaction is executed to lock in an exchange rate as close as possible to that previewed. Risk can also be minimized by establishing an earlier cut-off for cross-border market orders to ensure that an accompanying foreign exchange transaction can be initiated.

Limit orders on an equity guarantees that an equity will be bought or sold only at a specific price. This removes the price risk that accompanies market orders. With cross-border trades, however, the currency exchange risks remain and may, in fact, be greater. A limit order can potentially be left open for 60 days in the US market, for example, and currency rates can move substantially within that time frame. Risks from limit orders may be mitigated by, for example, reserving a margin for the exchange rate volatility factor when a limit order is placed. For most currencies, a 5-10% volatility factor should be sufficient for a 30-day period. The introducing broker would be expected to reserve this amount at the customer level based on the principal and brokerage amount. E*TRADE Global would apply the reserved amount to the introducing brokers account based on the principal. Another means to reduce risk from limit orders is marking-to-the market all open limit orders on a regular basis, such as at the end of the day. A third means to reduce this risk is to shorten the period during which a limit order is allowed to be open.

Cross-border trading also carries with it certain settlement risks from settling in each executing market on a daily basis. E*TRADE Global therefore incurs risks from introducing brokers failing to send funds to settle both currency and equity trades by the settlement of cut-off times, the complexity of coordinating settlement transactions to meet the requirements of the equity market, currency market, and banking hours in each country (time zone differences), and mismatches in currency and equity settlement dates where there are no forward markets or when the currency market is closed while the equity markets are open. These risks can be mitigated by each affiliate maintaining a reserve with E*TRADE Global equal to the value of the average payment volume generated in cross-border trades (for a number of settlement days) by the affiliate or a minimum USD 100,000, by the levy of a penalty on affiliates that fail to deliver settlement funds on a timely basis, by maintaining detailed settlement calendars for the currency market, each exchange, and banks, and by establishment of share or principal value thresholds that will require a secondary review and approval process.

Custody risks also exist in cross-border trading. The invention has each of the affiliates acting as the global custodian for all domestic securities held by customers in the rest of the network. The risks arise from any failure by the affiliate to properly segregate positions for the benefit of E*TRADE Global. It opens E*TRADE Global and the rest of the network to a liability if an affiliate fails and the rest of the network's holdings in domestic equities are tied up, or if there is fraud in the domestic office and the global network's holdings in domestic securities are compromised. Custody risk can be mitigated through a combination of legal and compliance due diligence before any affiliate is designated as the correspondent in a market for the rest of the E*TRADE Global trading network, and by obtaining excess insurance to cover this risk.

Regulatory risks arise from the ability to vet all orders based on local regulator's rules governing their residents trading abroad, foreigners trading in their markets, and any generic rules for anyone, resident or foreigners alike, trading in the market. In order to be in compliance with all jurisdictions, all orders should be vetted for both rules, and E*TRADE Global Clearing as an omnibus entity will not know any individual customer. In order to mitigate these risks, the legal liability should be allocated to executing brokers to update the rules investors need to know to trade in the target market and provide these to E*TRADE Global. Similarly, the risks can be mitigated by giving the introducing broker the obligation to retrieve and apply the rules of the target market, having both indemnify E*TRADE Global from any obligation to update and apply the regulatory rules, and having E*TRADE Global communicate and double check (auditing) affiliates on a regular basis.

Figure 11A:
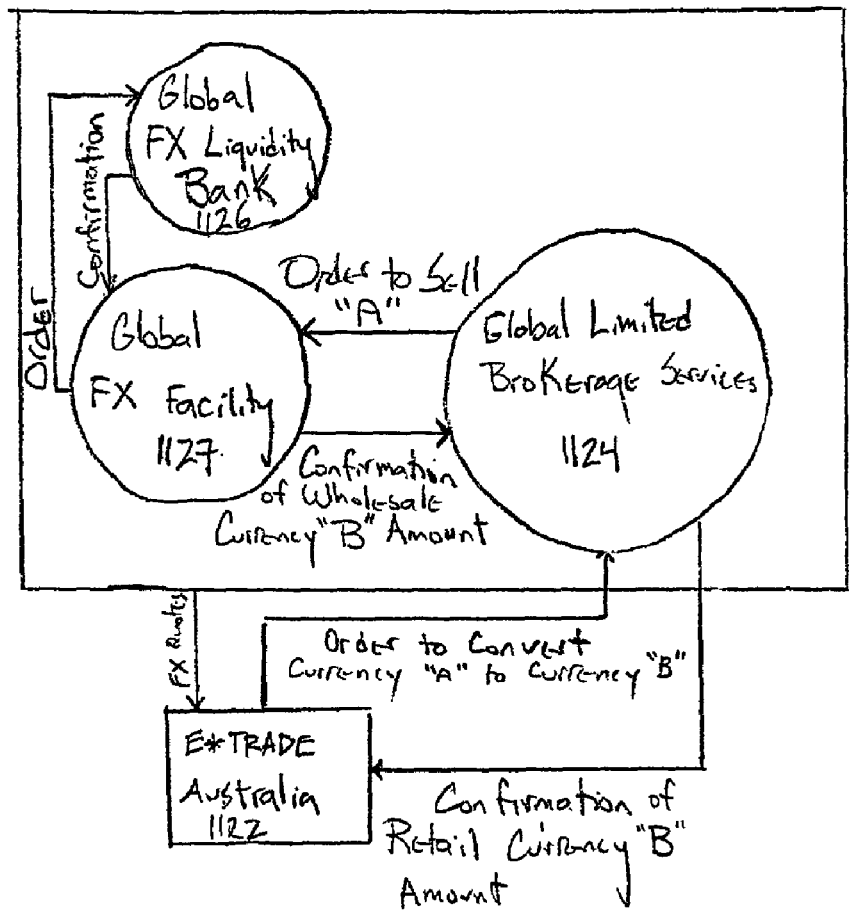
FIGS. 11A and 11B are flow diagrams illustrating a global foreign exchange system.
Figure 11B:
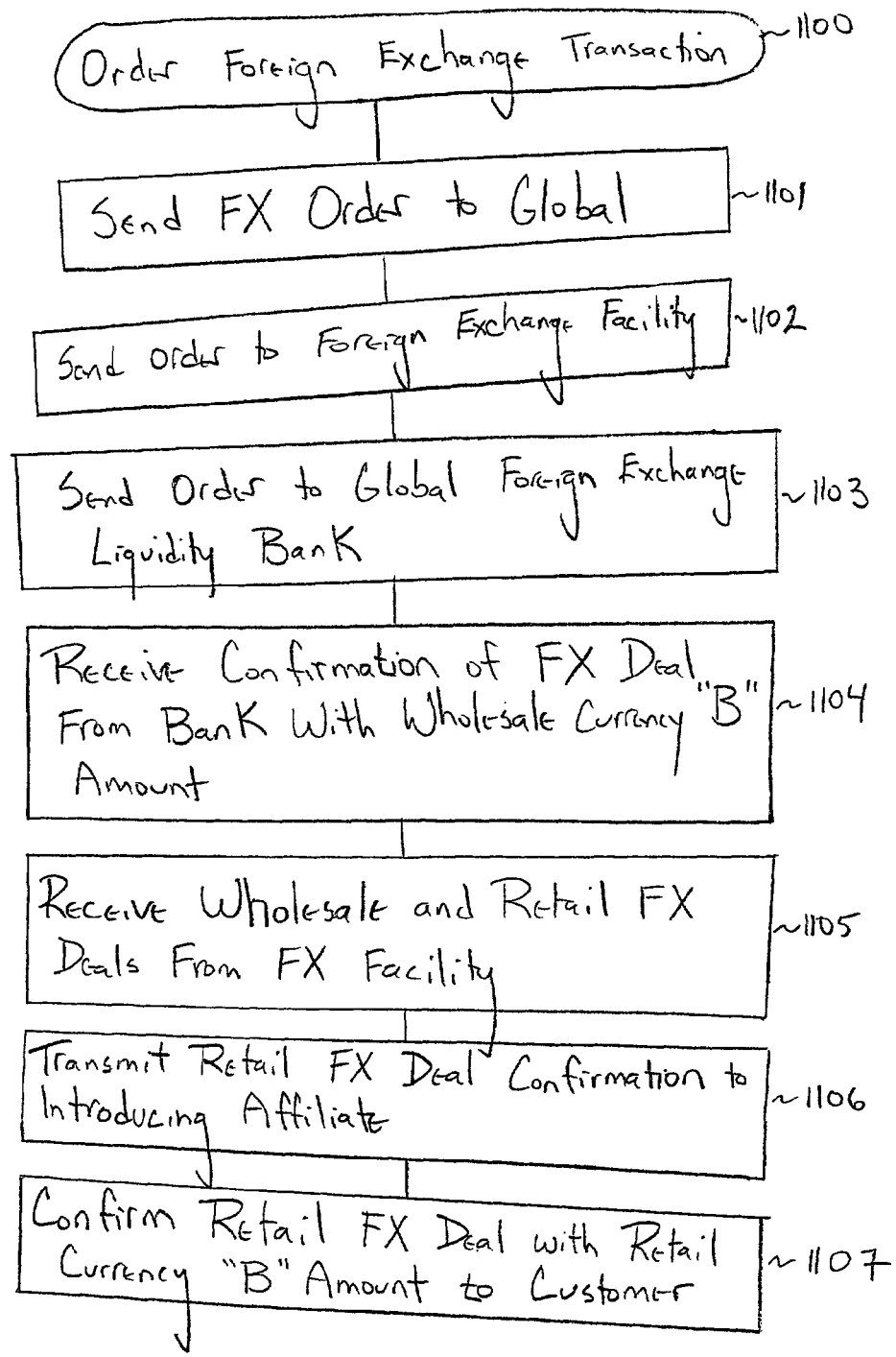

FIGS. 11A and 11B are a simplified system diagram and a flow diagram for a system useful for stand alone foreign exchange deals, where a customer is selling a known amount of a currency (currency A) in exchange for a second currency. This simplified diagram of FIGS. 11A and 11B includes the foreign exchange components integrated into the global trading system taught above. Such an arrangement may be used when the asset class at issue is currency, and the conversion of one currency to another is the primary concern. An introducing affiliate 1122 connects to the Global Limited Brokerage Services unit 1124, a Global Limited Foreign Exchange Facility 1127 and a Global Foreign Exchange Liquidity Bank 1126. The introducing affiliate does not connect directly to the Global Foreign Exchange Liquidity bank, but instead connects through the Global Brokerage unit 1124. A customer at the introducing affiliate receives foreign exchange quotes from the Global Foreign Exchange Facility, and enters an order at step 1100 to the introducing affiliate to trade or convert an amount of currency "A" to currency "B." At step 1100 when the customer places the FX order, he specifies that it is a spot deal. The customer account is immediately encumbered this amount. The order is sent to the Global unit 1124 on the foreign exchange trade date T+0 at step 1101. At step 1102, the Global unit sends to the Global Foreign Exchange Facility the order to sell a set amount of currency "A" for currency "B". This order is then sent to the Global Foreign Exchange Liquidity Bank 1126, where the exchange is made. At step 1103, the Global Foreign Exchange Liquidity Bank confirms the wholesale exchange rate of the deal and the counter currency amount for currency "B", and the actual settlement date to E*TRADE Global via the FX facility. At step 1104, the Global unit transmits confirmation of the retail foreign exchange deal to the Initiating Affiliate, who then confirms the deal to the customer including the amount of currency "B". At step 1105, on T+2, the debit is made in the customer account of an amount of currency "A" and a deposit is made in the customer account of currency "B".

Figure 12A:
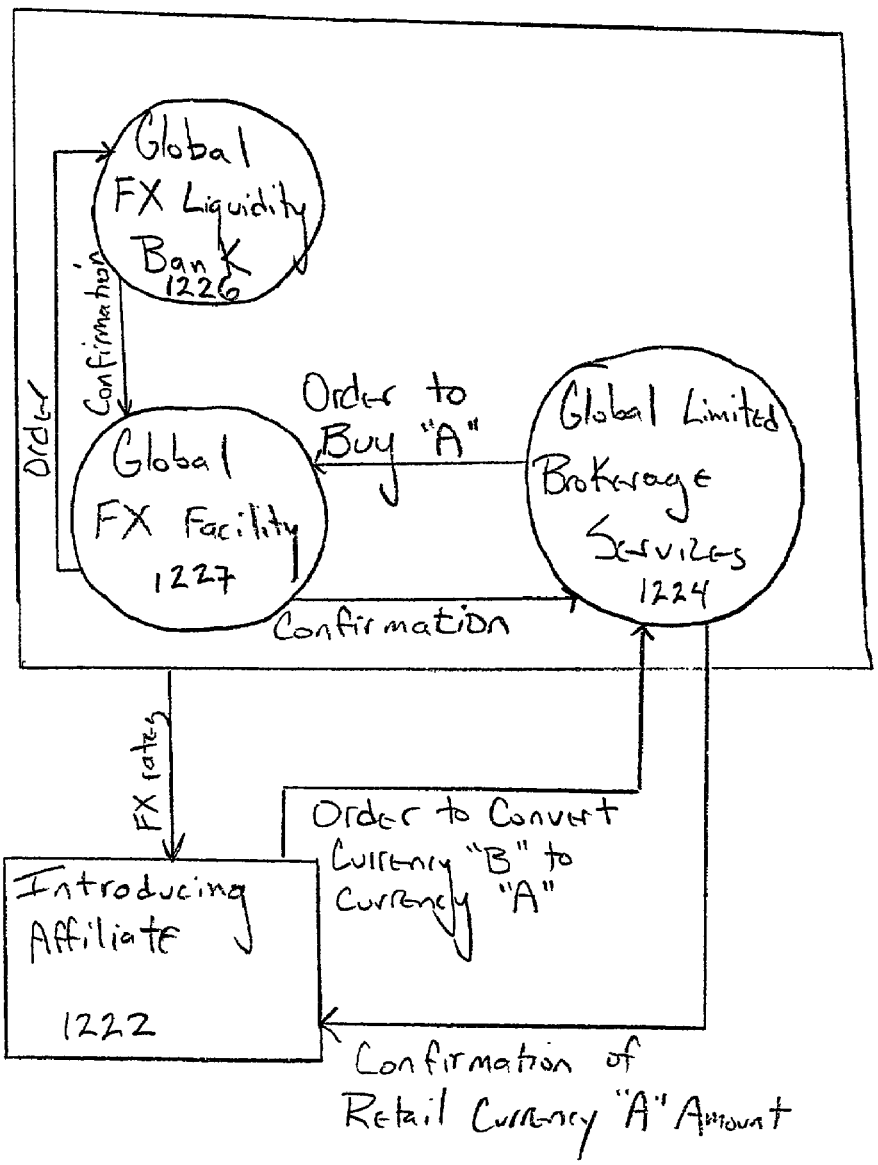
FIGS. 12A and 12B are flow diagrams illustrating a global foreign exchange system.
Figure 12B:
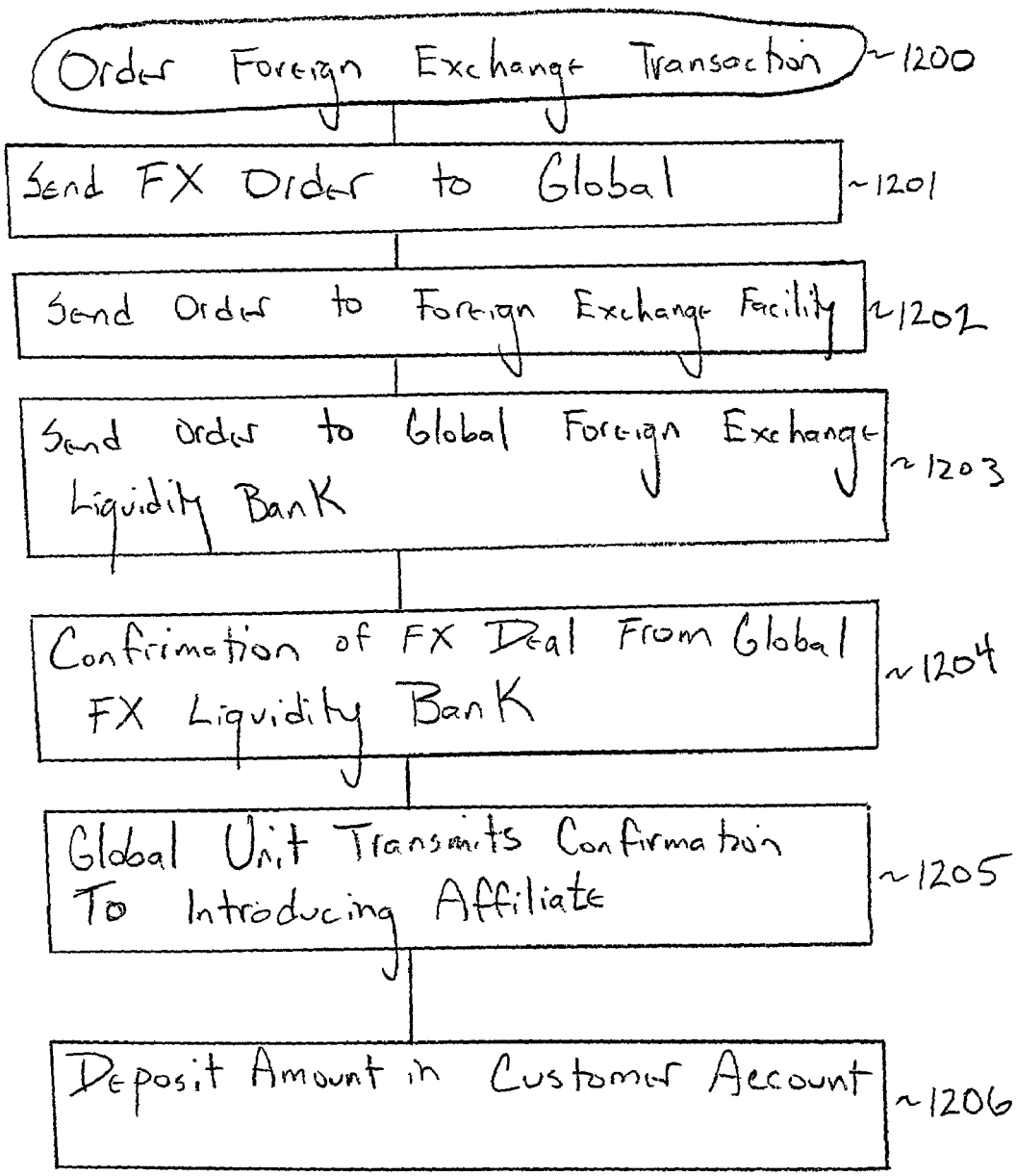

As can be appreciated by one of ordinary skill in the art, a foreign exchange system also necessarily includes an analogous series of steps on the buy side. FIGS. 12A and 12B are a simplified system diagram and a flow diagram for a system useful for stand alone foreign exchange deals, where a customer is buying a known amount of a currency (currency A) with a second currency. This simplified diagram of FIGS. 12A and 12B includes the foreign exchange components integrated into the global trading system taught above. Such an arrangement may be used when the asset class at issue is currency, and the conversion of one currency to another is the primary concern. An introducing affiliate 1222 connects to the Global Limited Brokerage Services unit 1224, a Global Limited Foreign Exchange Facility 1127 and a Global Foreign Exchange Liquidity Bank 1226. The introducing affiliate does not connect directly to the Global Foreign Exchange Liquidity bank, but instead connects through the Global Brokerage unit 1224. A customer at the introducing affiliate receives foreign exchange (FX) quotes from the Global Foreign Exchange Facility, and enters an order at step 1200 to the introducing affiliate to buy an amount of currency "A" with currency "B." At step 1200 when the customer places the FX order, he specifies that it is a spot deal. The customer account is immediately encumbered an estimated amount of currency B based on the preview rate. The order is sent to the Global unit 1224 on the foreign exchange trade date T+0 at step 1201. At step 1202, the Global unit sends to the Global Foreign Exchange Facility the order to buy a set amount of currency "A" for currency "B". This order is then sent to the Global Foreign Exchange Liquidity Bank 1226 at step 1203, where the exchange is made. At step 1204, the Global Foreign Exchange Liquidity Bank confirms the wholesale exchange rate of the deal and the counter currency amount for currency "B", and the actual settlement date to E*TRADE Global via the FX facility. At step 1205, the Global unit transmits confirmation of the retail foreign exchange deal to the Initiating Affiliate, who then confirms the deal to the customer including the amount of currency "B". At step 1206, on T+2, the deposit is made in the customer account of an amount of currency "A" and a debit is made in the customer account of currency "B".

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system of electronic trading, comprising:
    a global hub;
    local affiliates coupled to the global hub;
    wherein a local affiliate is configured to receive input and generate a buy or sell order for a security based on the input;
    wherein the global hub is configured to generate and initiate a foreign exchange order after execution of the buy or sell order, a size and a price of the foreign exchange order being based on the buy or sell order, the foreign exchange order having a settlement date prior to a settlement date of the buy or sell order.

2. The system of claim 1, wherein the global hub is configured to invest funds from settlement of the foreign exchange order for a time between settlement of the foreign exchange order and settlement of the buy or sell order.

3. The system of claim 1, wherein at least one local affiliate is not configured to be affiliated with more than one stock exchange.

4. The system of claim 1, wherein the local affiliate is configured to receive confirmation of the buy or sell order comprising a locked-in value based on the foreign exchange order, the locked-in value denominated in currency native to the local affiliate.

5. The system of claim 1, wherein at least one local affiliate is configured to be associated with an introducing broker account and an executing broker account.

6. The system of claim 1, wherein at least one local affiliate is configured to provide trading rules to the global hub.

7. The system of claim 1, wherein the global hub is configured to define which instruments can be traded.

8. The system of claim 1, wherein the global hub is configured to monitor open orders for currency fluctuations.

9. The system of claim 1, further comprising a foreign exchange facility.

10. The system of claim 9, wherein the foreign exchange facility is configured to accept a specified value date on the foreign exchange order to match the settlement date of the buy or sell order.

11. The system of claim 9, wherein the foreign exchange facility is configured to differentiate between the foreign exchange order based on the buy or sell order for the security and a foreign exchange order based on speculative trading in currency pairs.

12. The system of claim 1, wherein the local affiliate is configured to report a corporate action to the global hub, and the global hub is configured to report the corporate action to other local affiliates associated with orders impacted by the corporate action.

13. The system of claim 12, wherein the corporate action is selected from the group consisting of stock split; reverse split; name/symbol change; merger; tender offer; exchange offer; rights offer; warrant exercise; and dividend payout.

14. A method of electronic trading, comprising:
    receiving a buy or sell order for a security from a particular local affiliate out of a plurality of local affiliates;
    generating and initiating, by a global hub processor in response to and after execution of the buy or sell order for the security, a foreign exchange order, a size and a price of the foreign exchange order being based on the buy or sell order for the security;
    settling the foreign exchange order prior to settlement of the buy or sell order for the security.

15. The method of claim 14, further comprising investing funds from settlement of the foreign exchange order for a time between settlement of the foreign exchange order and settlement of the buy or sell order.

16. The method of claim 14, wherein at least one local affiliate is not affiliated with more than one stock exchange.

17. The method of claim 14, wherein confirmation of the buy or sell order comprises a locked-in value based on the foreign exchange order, the locked-in value denominated in currency native to the local affiliate.

18. The method of claim 14, wherein at least one local affiliate is associated with an introducing broker account and an executing broker account.

19. The method of claim 14, further comprising accepting trading rules from at least one local affiliate.

20. The method of claim 14, further comprising defining which instruments can be traded.

21. The method of claim 14, further comprising monitoring open orders for currency fluctuations.

22. The method of claim 14, further comprising accepting a specified value date on the foreign exchange order that matches a settlement date of the buy or sell order.

23. The method of claim 14, further comprising differentiating between the foreign exchange order based on the buy or sell order for the security and a foreign exchange order based on speculative trading in currency pairs.

24. The method of claim 14, further comprising receiving a report of a corporate action by the particular local affiliate and reporting the corporate action to other local affiliates associated with orders impacted by the corporate action.

25. The method of claim 24, wherein the corporate action is selected from the group consisting of stock split; reverse split; name/symbol change; merger; tender offer; exchange offer; rights offer; warrant exercise; and dividend payout.

* * * * *